(12) United States Patent
Chamas et al.

(10) Patent No.: US 7,268,702 B2
(45) Date of Patent: Sep. 11, 2007

(54) APPARATUS AND METHODS FOR PROVIDING A FLIGHT DISPLAY IN AN AIRCRAFT

(75) Inventors: Bassam H. Chamas, Redondo Beach, CA (US); Joseph S. Nalbach, Lakewood, CA (US); Ryuichi Yokota, Roading Hills Estates, CA (US)

(73) Assignee: Toyota Motor Sales, U.S.A., Inc., Torrance, CA (US)

( * ) Notice: Subject to any disclaimer, the term of this patent is extended or adjusted under 35 U.S.C. 154(b) by 975 days.

(21) Appl. No.: 10/350,124

(22) Filed: Jan. 24, 2003

(65) Prior Publication Data

US 2003/0179109 A1   Sep. 25, 2003

Related U.S. Application Data

(60) Provisional application No. 60/350,430, filed on Jan. 24, 2002.

(51) Int. Cl.
*G01C 23/00* (2006.01)
(52) U.S. Cl. .................. 340/975; 340/973; 701/14
(58) Field of Classification Search ........ 340/973–975, 340/979, 980, 971, 963; 701/3, 14, 9
See application file for complete search history.

(56) References Cited

U.S. PATENT DOCUMENTS

| | | | |
|---|---|---|---|
| 2,823,378 A * | 2/1958 | Reedy et al. ............... 342/407 |
| 3,701,279 A | 10/1972 | Harris et al. | |
| 3,746,844 A | 7/1973 | Azum et al. | |
| 4,326,189 A * | 4/1982 | Crane ........................ 340/973 |
| 4,831,538 A | 5/1989 | Cucchiari et al. | |
| 4,940,987 A | 7/1990 | Frederick | |
| 4,980,833 A | 12/1990 | Milligan et al. | |
| 5,202,690 A | 4/1993 | Frederick | |
| 5,331,330 A | 7/1994 | Susnjara | |
| 5,420,582 A * | 5/1995 | Kubbat et al. .............. 340/974 |
| 5,521,827 A | 5/1996 | Lindberg et al. | |
| 5,548,517 A | 8/1996 | Nance | |
| 5,691,531 A * | 11/1997 | Harris et al. ............... 244/3.14 |
| 5,758,297 A | 5/1998 | Gaultier | |
| 5,781,146 A | 7/1998 | Frederick | |
| 5,828,332 A | 10/1998 | Frederick | |
| 5,936,552 A | 8/1999 | Wichgers et al. | |

(Continued)

FOREIGN PATENT DOCUMENTS

EP       0 381 164 A2       8/1990

(Continued)

OTHER PUBLICATIONS

"ICDS 2000 Primary Flight Display," ARNAV Systems Inc., Website at http://www.arnav.com/icds2pfd.htm, printed Sep. 19, 2001 (2 pages).

(Continued)

*Primary Examiner*—Brent A. Swarthout
(74) *Attorney, Agent, or Firm*—Finnegan, Henderson, Farabow, Garrett & Dunner, LLP

(57) ABSTRACT

Apparatus and methods are provided for flight instruments in an electronic format. The flight instruments may appear in a standard configuration, including both primary flight instruments and secondary flight instruments. The apparatus and methods may also provide some or all of the primary flight instruments in one visual representation.

78 Claims, 32 Drawing Sheets

U.S. PATENT DOCUMENTS

| | | | |
|---|---|---|---|
| 6,038,498 | A | 3/2000 | Briffe et al. |
| 6,057,786 | A | 5/2000 | Briffe et al. |
| 6,085,129 | A | 7/2000 | Schardt et al. |
| 6,094,608 | A | 7/2000 | Bomans et al. |
| 6,111,525 | A * | 8/2000 | Berlioz et al. ............. 340/971 |
| 6,128,951 | A | 10/2000 | Nance |
| 6,317,659 | B1 | 11/2001 | Lindsley et al. |
| 6,392,661 | B1 | 5/2002 | Tankersley |
| 6,405,107 | B1 * | 6/2002 | Derman ........................ 701/3 |
| 6,489,898 | B1 * | 12/2002 | Nicholls .................... 340/975 |
| 6,512,527 | B1 | 1/2003 | Barber et al. |
| 6,639,522 | B2 | 10/2003 | Derderian |
| 6,653,947 | B2 | 11/2003 | Dwyer et al. |
| 6,690,298 | B1 | 2/2004 | Barber et al. |
| 6,690,299 | B1 | 2/2004 | Suiter |
| 6,853,315 | B2 * | 2/2005 | Schiller et al. ............ 340/974 |
| 6,865,453 | B1 * | 3/2005 | Burch et al. ................... 701/4 |
| 6,867,711 | B1 * | 3/2005 | Langner et al. ............. 340/979 |
| 6,985,091 | B2 * | 1/2006 | Price ........................ 340/975 |
| 6,995,690 | B1 | 2/2006 | Chen et al. |
| 7,091,881 | B2 * | 8/2006 | Judge et al. ................ 340/979 |

FOREIGN PATENT DOCUMENTS

| | | |
|---|---|---|
| EP | 0 381 164 A3 | 8/1990 |
| EP | 0 802 469 A1 | 10/1997 |
| GB | 1 226 214 A | 3/1971 |
| WO | WO 85/01372 | 3/1985 |
| WO | WO 93/16359 | 8/1993 |

OTHER PUBLICATIONS

"Iowa Research Partnership: Flight simulator tests new visual display system for pilots," ISGC Newsbrief #4, Website at http://www.public.iastate.edu/~isgc/NEWS/newbrief.htm, printed Sep. 19, 2001 (8 pages).

Ken Funk, "The AgendaManager Simulation Enviroment," Website at http://flightdeck.ie.orst.edu/CTM/amsim.html, printed Sep. 19, 2001 (3 pages).

"Space age flight benefits from human touch," MicroTouch World, vol. III, No. 2, Website at http://www.microtouch.com/mthtml/07b1 vol3 No2 Flight,htm, printed Sep. 19, 2001 (2 pages).

"If you've always wanted a real glass cockpit. . .," CSI - Enrico Schirattl's Project Magenta, Website at http://www.bfsmedia.com/~cockpits/products/pfd/pfd parts.html, printed Sep. 19, 2001 (5 pages).

"The Primus 1000," Honeywell BCAS: Primus 1000: Electronic Flight Instruments Systems (EFIS), Website at http://www.cas.honeywell.com/bcas/products/primus 1000 efis.cfm, printed Sep. 19, 2001 (2 pages).

"Avidyne Announces Successful Cross-Country Flight of Lancair Columbia 400 Using Integrated Flight Deck Displays," Website at http://www.avidyne.com/Columbia400 info.htm, printed Sep. 19, 2001 (2 pages).

"The 737 Virtual Flight Deck," Website at http://www.boeing.com/commercial/aeromagazine/aero 04/textonly/ps02txt.html, printed Sep. 19, 2001 (8 pages).

"Sierra Flight Systems EFIS Symbology," Website at http://sierraflightsystems.com/symbology base.html, printed Sep. 19, 2001 (16 pages).

"E-Flight Airbus Primary Flight Display (PFD)," Website at http://e-flight.com/a320pfd.htm, printed Sep. 19, 2001 (2 pages).

"Essential Use Case for Creating a Primary Flight Display," Website at http://www.icaen.uiowa.edu/~kuhl/SoftEngSlides/Roger/HW1.htm, printed Sep. 19, 2001 (2 pages).

"Primary Flight Display," Website at http://www.schiratti.com/magenta/details/pfd.html, printed Sep. 19, 2001 (3 pages).

"NASA Lays Hands on HITS," Plane & Pilot, vol. 37, No. 10, Oct. 2001, pp. 3; 11 (2 pages).

"Designer Vision," Plane & Pilot, vol. 37, No. 10, Oct. 2001 (2 pages).

"Federal Aviation Regulations/Aeronautical Information Manual (FAR/AIM)," U.S. Dept. of Transportation, 2002 (1 book).

"Do-it-yourself weighting machine approved," Flight International, Reed Business Information, Haywards Health, G.B., vol. 154, No. 4632, p. 30, Jul. 1, 1998 (1 page).

Payne B., "Aircraft Weighing," Measurement and Control, Institute of Measurement and Control, London, G. B., vol. 24, No. 4, pp. 102-104, May 1, 1991 (3 pages).

* cited by examiner

APPARATUS AND METHODS FOR PROVIDING A FLIGHT DISPLAY IN AN AIRCRAFT

I. RELATED APPLICATION

This application claims the benefit of U.S. Provisional Patent Application No. 60/350,430 for Apparatus and Methods for Providing a Flight Display in an Aircraft, which is expressly incorporated herein by reference. Application No. 60/350,430 was filed on Jan. 24, 2002, by Bassam H. Chamas, Joseph S. Nalbach and Ryuichi Yokota.

II. TECHNICAL FIELD

The present invention relates to apparatus and methods for providing a flight display in an aircraft. In particular, the present invention relates to apparatus and methods for providing flight instruments on a flight display in an aircraft.

III. BACKGROUND

Currently, the flight instruments in many aircraft are based on mechanical devices. In most aircraft, these mechanical devices include various types of instruments, including vacuum-driven instruments, pitot-static-driven instruments, and electrical-driven instruments. Although providing safety through redundancy, most of the primary flight instruments are based on vacuum-driven instruments and pitot-static-driven instruments, even though current electrical-driven instruments are more reliable.

The standard flight instruments include both primary flight instruments and secondary flight instruments. These flight instruments are located on an instrument panel in the aircraft. The primary flight instruments are generally located in a standard configuration, but the secondary flight instruments may be located in numerous positions on the instrument panel. Every aircraft may have a different instrument configuration. The lack of uniformity in the arrangement of these flight instruments can be confusing to a pilot, particularly if the pilot flies more than one type of aircraft.

The primary flight instruments in current aircraft are generally distributed among more than one visual representation. In most aircraft, especially general aviation aircraft, the primary flight instruments include six flight instruments: an attitude indicator (also know as an artificial horizon), a heading indicator (or a horizontal situation indicator), an altimeter, an airspeed indicator, a turn indicator (or a turn-and-slip indicator, if an inclinometer is included), and a vertical speed indicator. Thus, when a pilot is flying a complicated approach or procedure, the pilot must visually acquire information from at least these six instruments. Some current systems combine some of these instruments, but such systems have limited functionality, scope, and utility.

There is a need for apparatus and methods for providing flight instruments in an electronic format. There is also a need for apparatus and methods for providing flight instruments in a standard configuration, including both primary flight instruments and secondary flight instruments. There is still also a need for apparatus and methods for providing some or all of the primary flight instruments in one visual representation. There is further a need for apparatus and methods that combine providing flight instruments in a standard configuration with flight instruments in an electronic format with some or all of the primary flight instruments in one visual representation.

This invention addresses these needs in various embodiments of a flight display.

IV. SUMMARY OF THE INVENTION

The apparatus and methods consistent with the present invention provide a method for providing flight information on an aircraft display comprising displaying heading flight information on the display, wherein the heading flight information further comprises a compass rose; displaying attitude flight information on the display, wherein the attitude flight information comprises an artificial horizon, and wherein the artificial horizon is situated within the compass rose; displaying turn indicator flight information on the display, wherein the turn indictor flight information further comprises bank angle indicator information and turn rate information, and wherein the bank angle indicator information and turn rate information is depicted on the compass rose; and wherein the flight information is depicted over background information, wherein the background information further comprises terrain data.

Exemplary apparatus and methods consistent with the present invention are recited in the attached claims. It is to be understood that both the foregoing general description and the following detailed description are exemplary and explanatory only and are not restrictive of the invention, as claimed.

V. BRIEF DESCRIPTION OF THE DRAWINGS

The accompanying drawings, which are incorporated in and constitute a part of this specification, illustrate several embodiments of the invention and, together with the following description, serve to explain the principles of the invention.

VI. DETAILED DESCRIPTION

A. Introduction

The present invention relates to apparatus and methods for providing flight instruments on a flight display in an aircraft. In the following paragraphs, several examples of apparatus and methods for providing flight instruments on a flight display in an aircraft are provided. However, these examples are exemplary, and other apparatus and methods may be used for providing flight instruments on a flight display.

Figure 1:
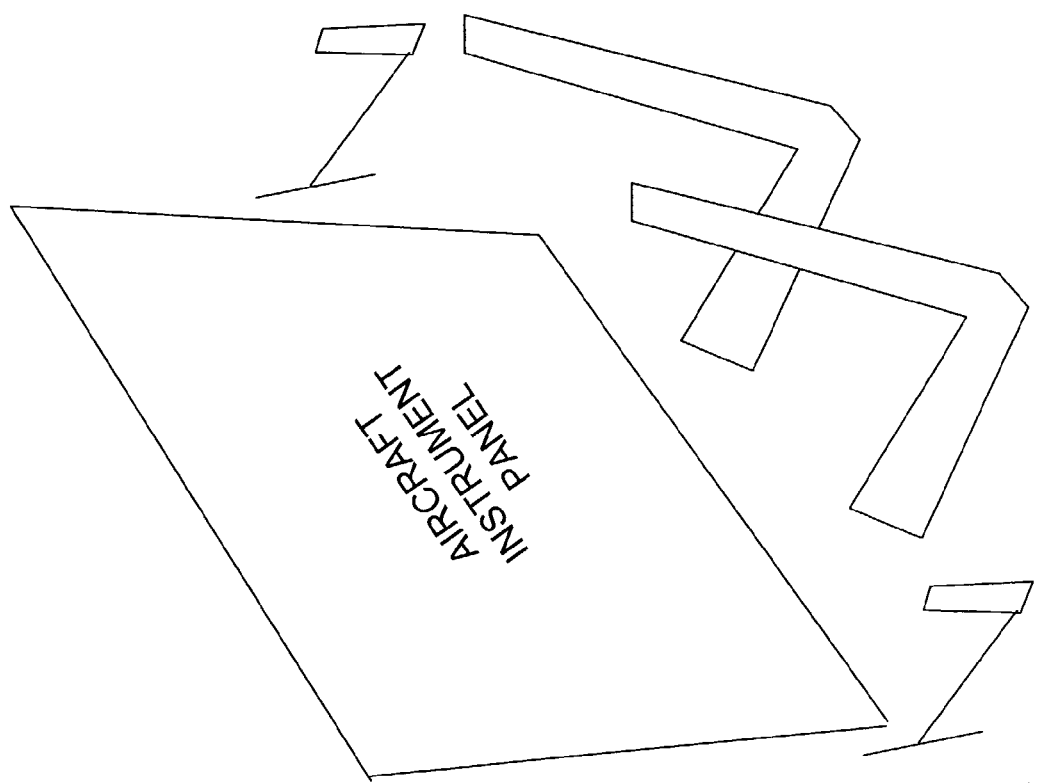
FIG. 1 is a representation of a cockpit in an aircraft.

FIG. 1 is a representation of a cockpit in an aircraft. As shown in FIG. 1, a cockpit 100 includes a pilot seat 120, a co-pilot seat 140, control mechanisms 160, and an aircraft instrument panel 180. The cockpit may also contain other components (not shown).

Figure 2:
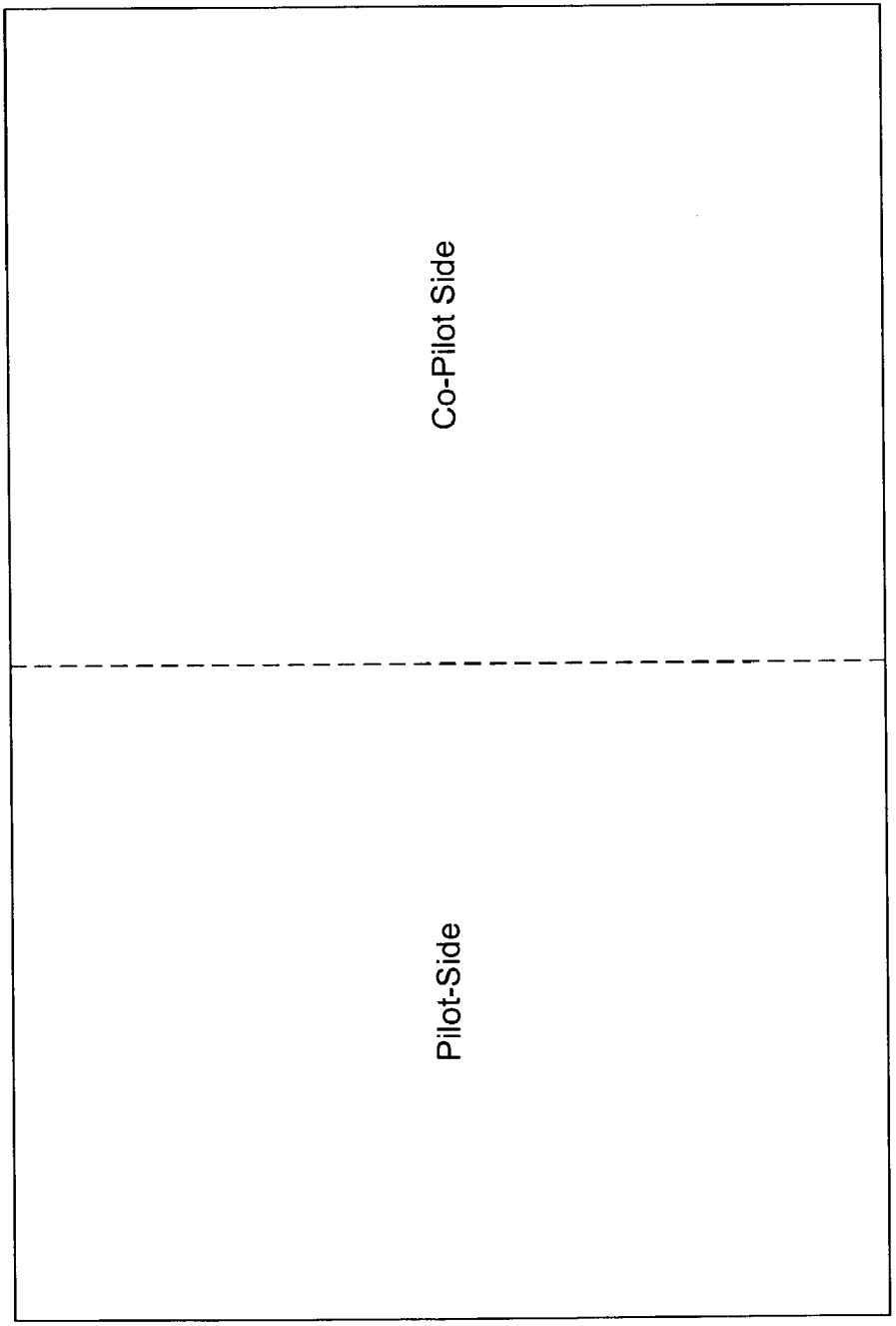
FIG. 2 is a general diagram of an aircraft instrument panel, as shown in FIG. 1.

FIG. 2 is a general diagram of an aircraft instrument panel, as shown in FIG. 1. As shown in FIG. 2, an aircraft instrument panel 200 includes a pilot side 220 and a co-pilot side 240. In one implementation, pilot side 220 may be equally proportioned to co-pilot side 240. In other implementations, pilot side 220 may be disproportional to co-pilot side 240. The shape of aircraft instrument panel 200 may be in any configuration.

Figure 3:
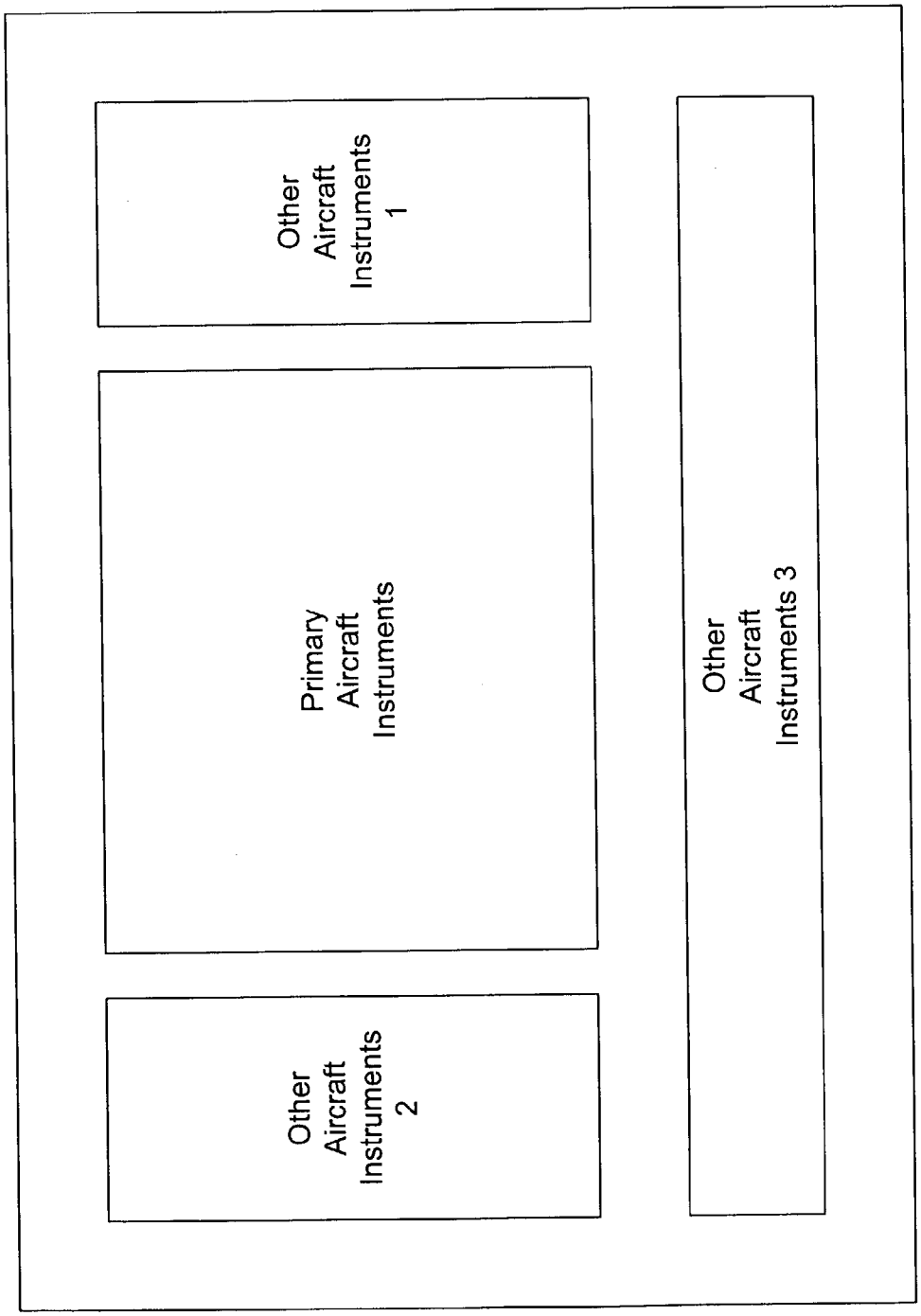
FIG. 3 is a general diagram of a pilot side of an instrument panel, as shown in FIG. 2.

FIG. 3 is a general diagram of a pilot side of an instrument panel, as shown in FIG. 2. As shown in FIG. 3, a pilot side 300 of the instrument panel includes primary aircraft instruments 320 and other aircraft instruments, including other aircraft instruments 1 340, other aircraft instruments 2 360, and other aircraft instruments 3 380. Primary aircraft instruments 320 are generally located in the center of pilot side 300 of the aircraft instrument panel. The other aircraft instruments may be located at other locations on pilot side 300 of the instrument panel. In FIG. 3, other aircraft instruments 1 340 are depicted as to the right of primary aircraft instruments 320, other aircraft instruments 2 360 are depicted as to the left of primary instruments 300, and other aircraft instruments 3 380 are depicted as below primary aircraft instruments 320. Both primary aircraft instruments 320 and the other aircraft instruments may be arranged on pilot side 300 of the instrument panel in any configuration. These (or other) instruments may also be arranged on the co-pilot side of the instrument panel in any configuration.

Figure 4:
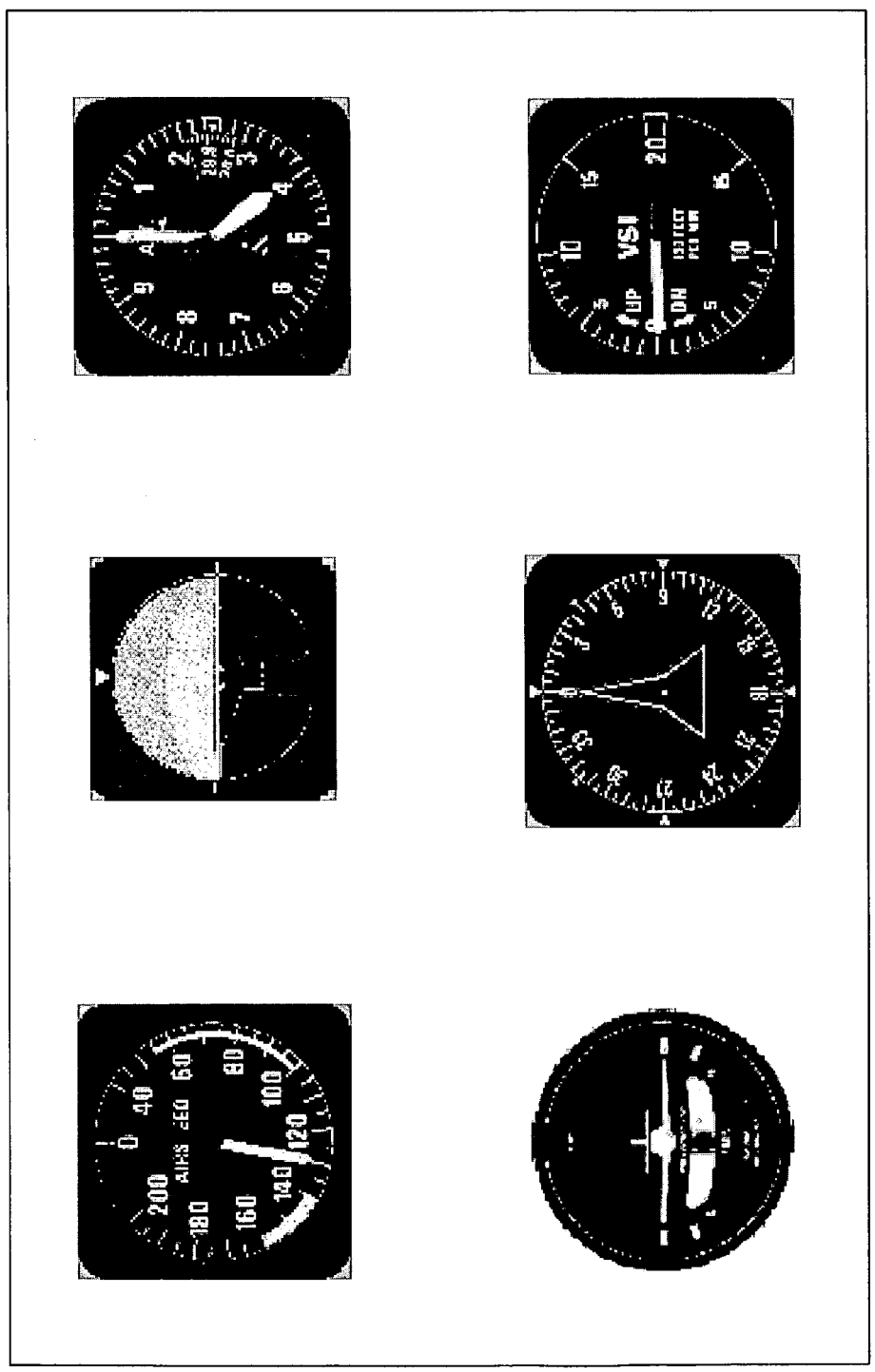
FIG. 4 is a block diagram of primary aircraft instruments on a pilot side of an aircraft instrument panel, as shown in FIG. 3.

FIG. 4 is a block diagram of primary aircraft instruments on a pilot side of an aircraft instrument panel, as shown in FIG. 3. As shown in FIG. 4, primary aircraft instruments 400 include an attitude indicator 410, a heading indicator 420, an altimeter 430, an airspeed indicator 440, a turn indicator 450, and a vertical speed indicator 460. Primary aircraft instruments 400 shown in FIG. 4 are the most common flight instruments for an aircraft. Attitude indicator 410, also known as the artificial horizon, is the basic instrument used to fly the aircraft. Attitude indicator 410 is generally a gyroscopic instrument that tells the pilot whether the attitude of the aircraft is nose high or nose low or is banked to the left or banked to the right. Heading indicator 420, also known as a directional gyro, is a gyroscopic instrument that indicates a heading of the aircraft. Heading indicator 420 also includes a horizontal situation indicator, which is a more advanced type of heading indicator. Altimeter 430 is an instrument that indicates the height of the aircraft above sea level. Altimeter 430 may be adjusted based on changes in barometric pressure, using a Kollsman window. Airspeed indicator 440 is an instrument that indicates the speed of the aircraft through air. Airspeed according to airspeed indicator 440 is usually presented in knots or miles per hour. Turn indicator 450 is an instrument that indicates a rate of turn. The rate of turn is the rate at which the aircraft is turning based on a standard (such as, a 180° reference). Turn indicator 450 also usually includes an inclinometer, in which case the turn indicator is known as a turn-and-slip indicator. The inclinometer is a level-type device with a ball, which indicates whether the aircraft is in coordinated flight (i.e., not in a slip or in a skid). Vertical speed indicator 460 is an instrument that shows whether the aircraft is climbing or descending and the speed at which the aircraft is climbing or descending (generally in feet per minute). Other instruments (not shown) may also be included in the primary aircraft instruments.

Figure 5:
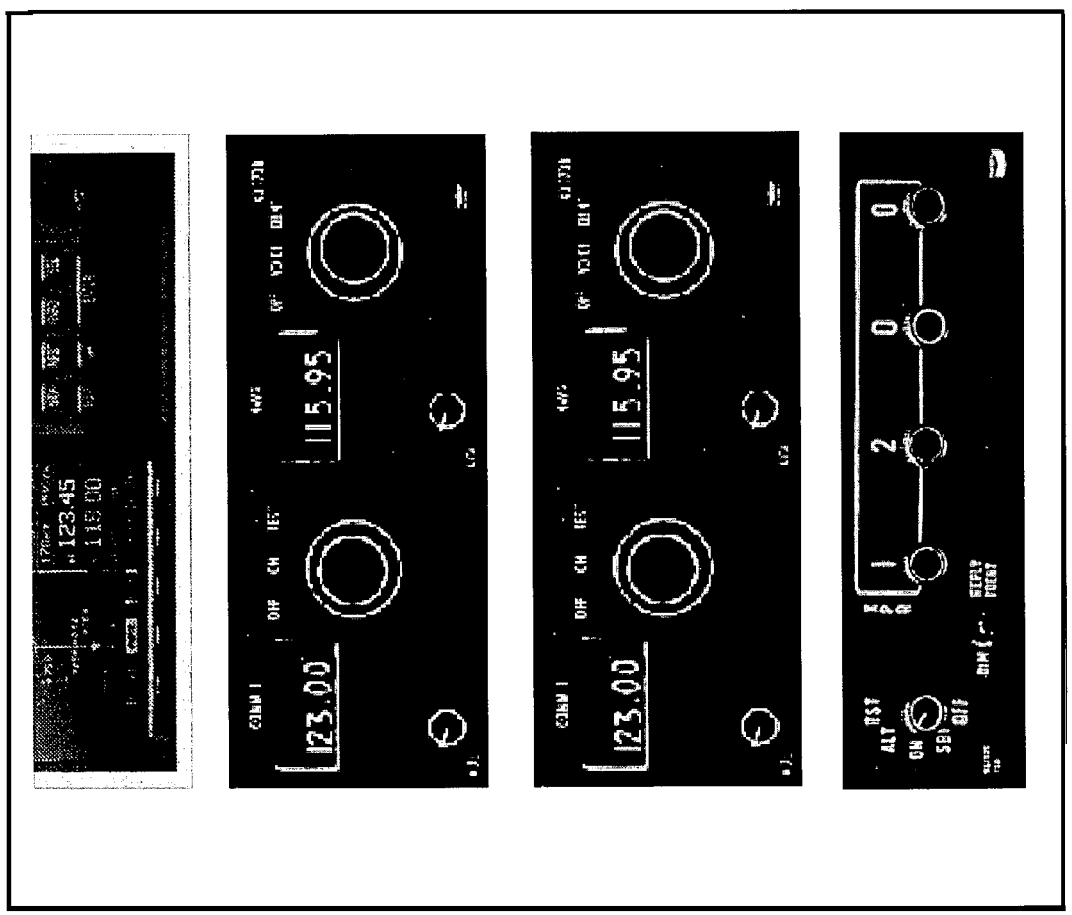
FIG. 5 is an illustration of other aircraft instruments 1 in a pilot side of an aircraft instrument panel, as shown in FIG. 3.

FIG. 5 is an illustration of other aircraft instruments 1 in a pilot side of an aircraft instrument panel, as shown in FIG. 3. Other aircraft instruments 1 500, as shown in FIG. 5, typically includes a "radio stack." The radio stack is typically located to the right of the primary aircraft instruments, as shown in FIG. 3. The radio stack typically contains an intercom, communication equipment, and navigation equipment. The intercom provides for communication within the aircraft. The communication equipment provides a source of communication between the pilot and co-pilot and air traffic control (ATC). The navigation equipment provides a source of radio navigation.

As shown in FIG. 5, in one implementation, other aircraft instruments 1 500 includes an intercom 510, a navigational device 520, a first communication/navigation device 530, a second communication/navigation device 540, and a transponder 550. Intercom 510 provides for communication within the aircraft, such as between the pilot and co-pilot and between the pilot and co-pilot and the crew and passengers. Navigational device 120 provides a source of navigation based on a global positioning satellite (GPS) service. Other navigation devices may also be used, such as, for example, inertial systems, Loran systems, or any other navigational device. First and second communication/navigation devices 530 and 540 provide the pilot and co-pilot with primary and secondary communication capabilities to locations outside the aircraft and with primary and secondary back-up navigational capabilities. Transponder 550 provides a mechanism by which an aircraft may identify itself to a radar display in an ATC facility. FIG. 5 depicts only one example of a radio stack. The components in this radio stack are merely exemplary, and other radio stacks may include other components or any other combination of components.

Figure 6:
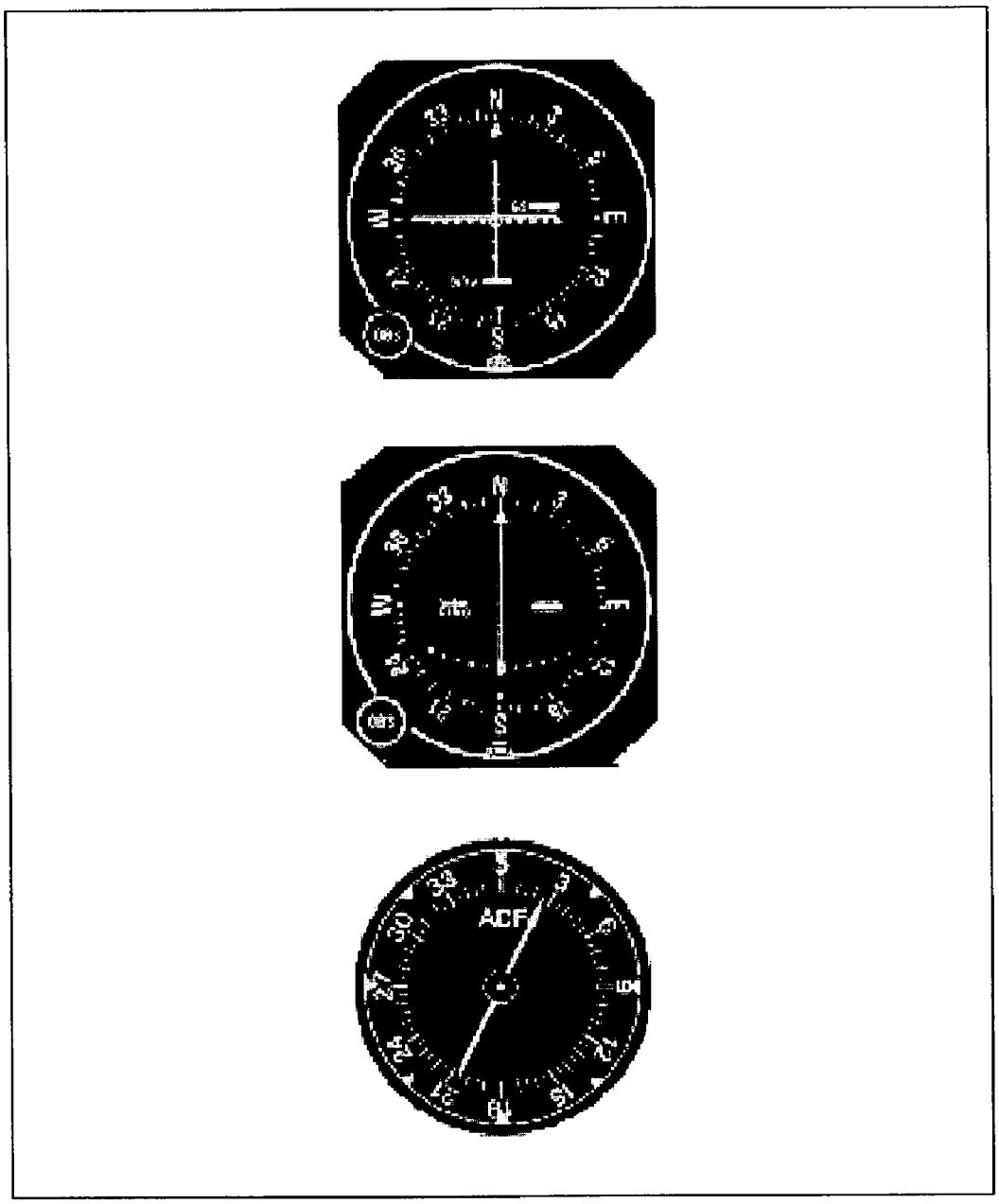
FIG. 6 illustrates other aircraft instruments 2 on a pilot side of an aircraft instrument panel, as shown in FIG. 3.

FIG. 6 illustrates other aircraft instruments 2 on a pilot side of an aircraft instrument panel, as shown in FIG. 3. As shown in FIG. 6, other aircraft instruments 2 600 includes a first VOR receiver 620, a second VOR receiver 640, and a ADF receiver 660. Other aircraft instruments 2 600 are generally located in close proximity to the primary aircraft instruments. Other aircraft instruments 2 600 may also be located in close proximity to other aircraft instruments 1. As shown in FIG. 3, in one implementation, other aircraft instruments 2 600 are located to the left of the primary aircraft instruments. However, in other implementations, other aircraft instruments 2 600 may be located anywhere on the instrument panel.

VOR receiver 1 620 and VOR receiver 2 640 contain course deviation indicators that give a pilot an indication of the position of the aircraft with reference to a navigational transmitter located on the ground. VOR receiver 1 620 and VOR receiver 2 640 may also contain a glide slope indicator (as shown on VOR receiver 1 620) that allows a pilot to fly an instrument approach on an instrument landing system (ILS). ADF receiver 660 is another navigational receiver for receiving signals from a navigational transmitter located on the ground. Other navigational receivers may also be used in other aircraft instruments 2 600 or anywhere else on the instrument panel.

Figure 7:
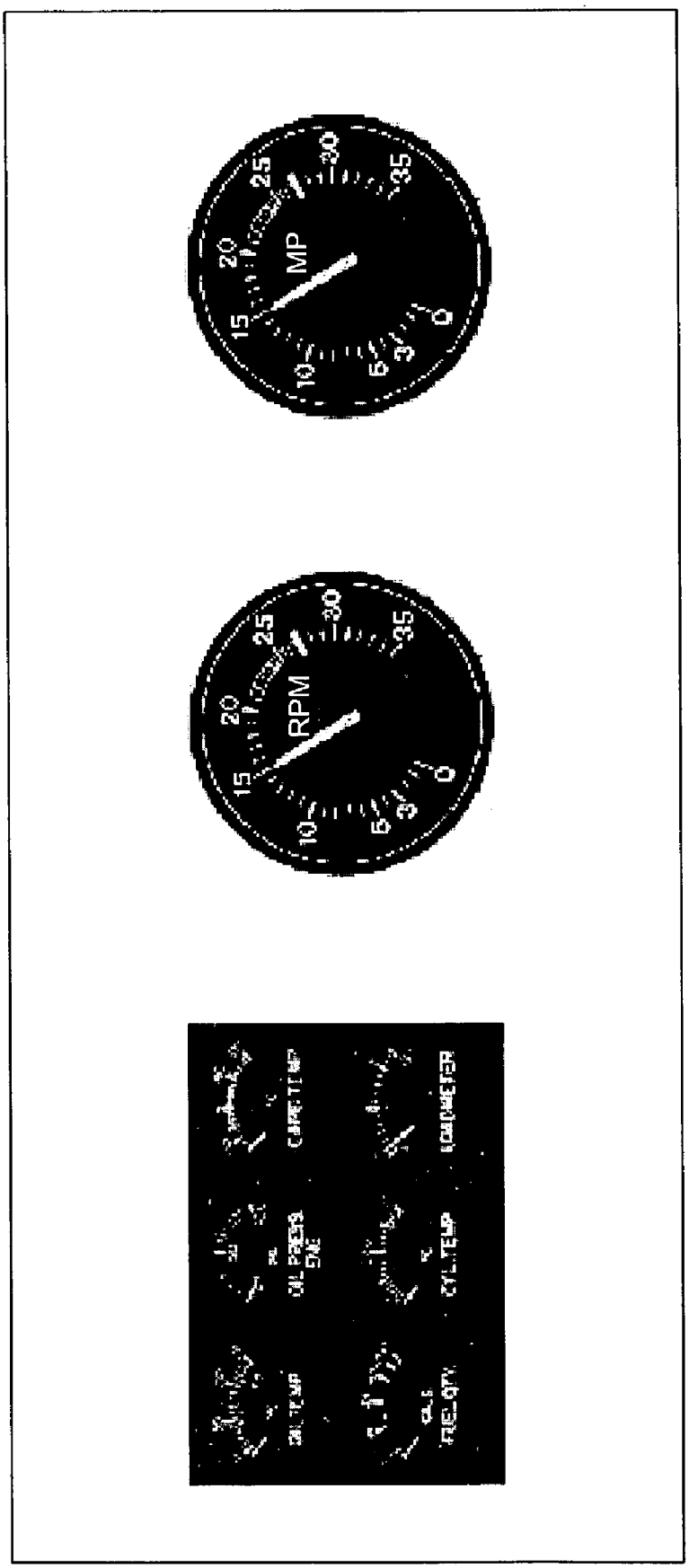
FIG. 7 illustrates other aircraft instruments 3 on a pilot side of an aircraft instrument panel, as shown in FIG. 3.

FIG. 7 illustrates other aircraft instruments 3 on a pilot side of an aircraft instrument panel, as shown in FIG. 3. As shown in FIG. 7, other aircraft instruments 3 700 includes an engine gauge cluster 720, a tachometer 740, and a manifold pressure gauge 760. In one implementation, other aircraft instruments 3 700 is depicted in FIG. 3 as located below the primary aircraft instruments. However, in other implementations, other aircraft instruments 3 700 may be located anywhere on the instrument panel.

Engine gauge cluster 720 includes gauges that monitor the engine performance. These gauges may include an oil temperature gauge 721, an oil pressure gauge 722, a carburetor temperature gauge 723, a fuel quantity gauge 724, a cylinder temperature gauge 725, and a volts gauge 726. Tachometer 740 indicates the rotations per minute (RPM) of the engine, which assists the pilot in adjusting the RPM of the engine. Manifold pressure gauge 760 indicates the manifold pressure (MP) of the engine, which assists the pilot in adjusting the MP of the engine. Other instruments may also be included in other aircraft instruments 3 700.

As shown in FIG. 3, the pilot side of the aircraft instrument panel may include primary aircraft instruments 320, other aircraft instruments 1 340, other aircraft instruments 2 360, and other aircraft instruments 3 380. Each of these components of the aircraft instrument panel may also include other subcomponents. Indeed, any number of subcomponents (such as, for example, instruments, gauges, or any other indicators) may be included within the aircraft instrument panel or within any of the components of the aircraft instrument panel as shown in FIG. 3.

Figure 8A:
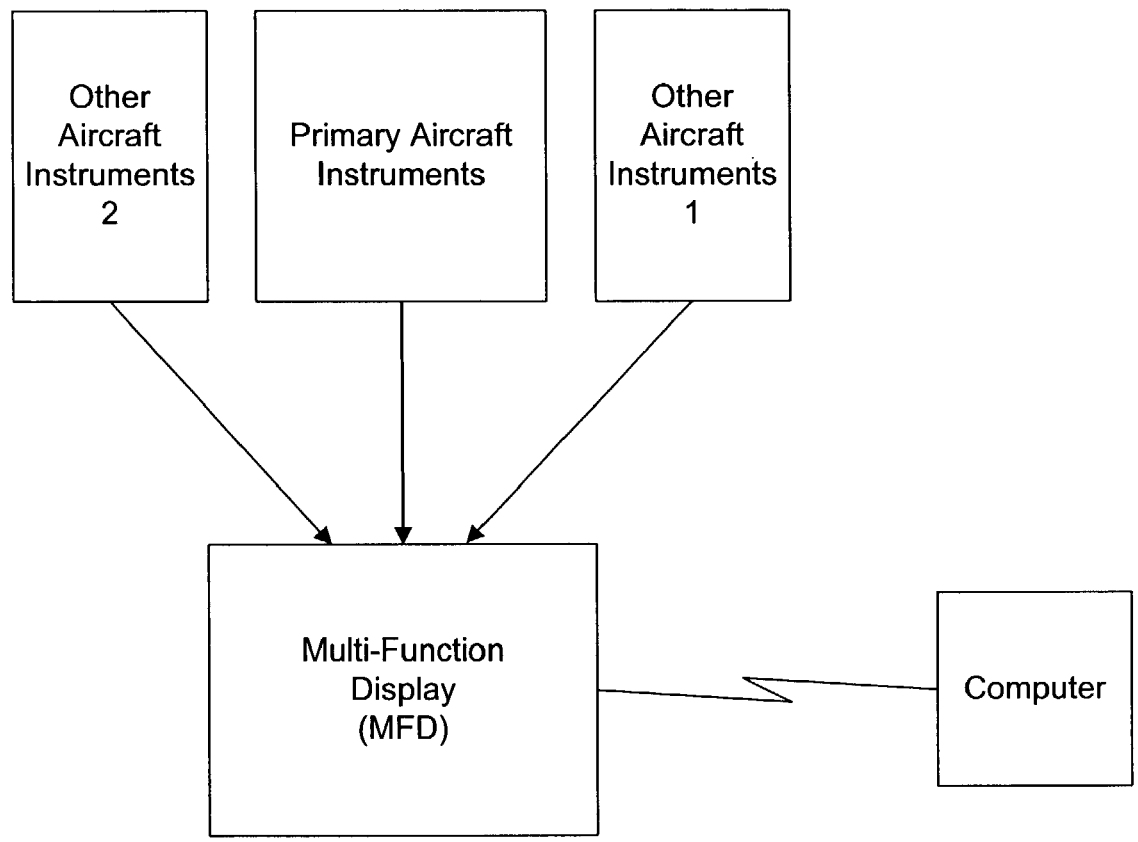
FIG. 8A is a block diagram of a multi-function (MFD) display according to one embodiment consistent with the invention.

FIG. 8A is a block diagram of a multi-function (MFD) display according to one embodiment consistent with the invention. A MFD 800 may refer to any avionics display providing displays of multiple functions, such as a primary-function (PFD) display. As is well-known to those skilled in the art, MFD 800 may be a CRT display, a plasma display, a LCD display, a touch sensitive display, or any other type of electronic display device.

As shown in FIG. 8A, in one implementation, MFD 800 displays flight information from primary aircraft instruments 805, other aircraft instruments 1 810, and other aircraft instruments 2 820. Flight information may include any of heading information, attitude information, turn indicator information, highway-in-the sky indicator information, altitude information, airspeed information, vertical speed information, transponder information, intercom information, communication information, and background information. Flight information may also include any other information. Thus, in this implementation, MFD 800 also includes all of the subcomponents of primary aircraft instruments 805, other aircraft instruments 1 810, and other aircraft instruments 2 815, as described above. In this implementation, information from these components and subcomponents are then depicted on MFD 800 via a computer 820. Computer 820 maintains the information from the components and subcomponents and displays the information on MFD 800. Computer 820 is described in more detail in FIG. 9. These components and subcomponents are merely exemplary, and other implementations may also be used.

Figure 8B:
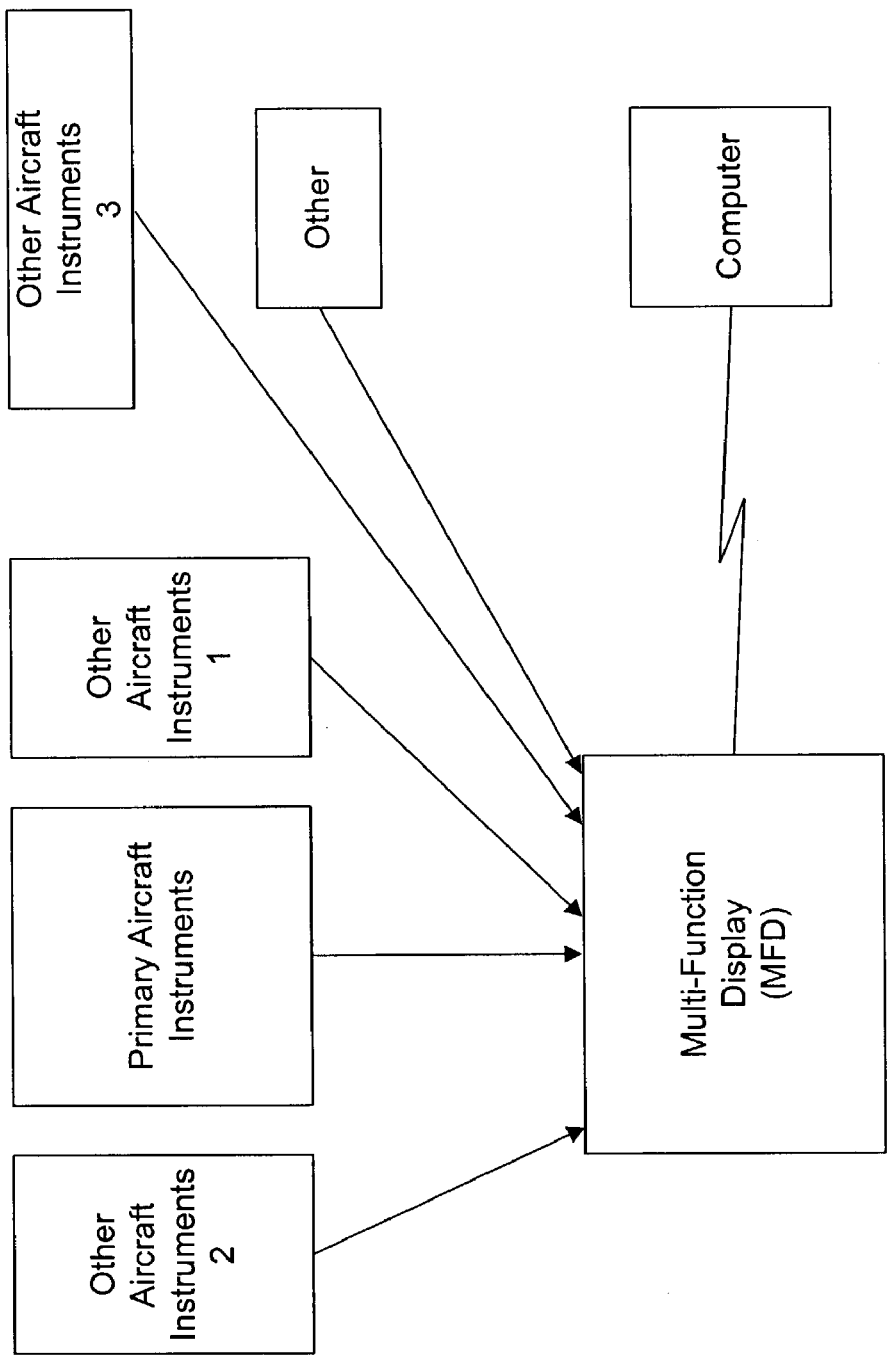
FIG. 8B is another block diagram of a MFD according to another embodiment consistent with the invention.

FIG. 8B is another block diagram of a MFD according to another embodiment consistent with the invention. As shown in FIG. 8B, in one implementation, MFD 850 includes information from primary aircraft instruments 805, other aircraft instruments 1 810, other aircraft instruments 2 815, other aircraft instruments 3 825, and other 830. Thus, in this implementation, MFD 850 in FIG. 8B includes information from the same components as MFD 800 in FIG. 8A, except that MFD 850 in FIG. 8B also includes information from other aircraft instruments 3 825 and other 830, as described above. Other 830 indicates that other components or other subcomponents (including instruments or any other type of indicators) may be included within MFD 850.

In this implementation, these components and subcomponents are all controlled by computer 820, which is connected the MFD 850. Computer 820 is described in more detail in FIG. 9. These components and subcomponents are merely exemplary, and other implementations may also be used.

Figure 9:
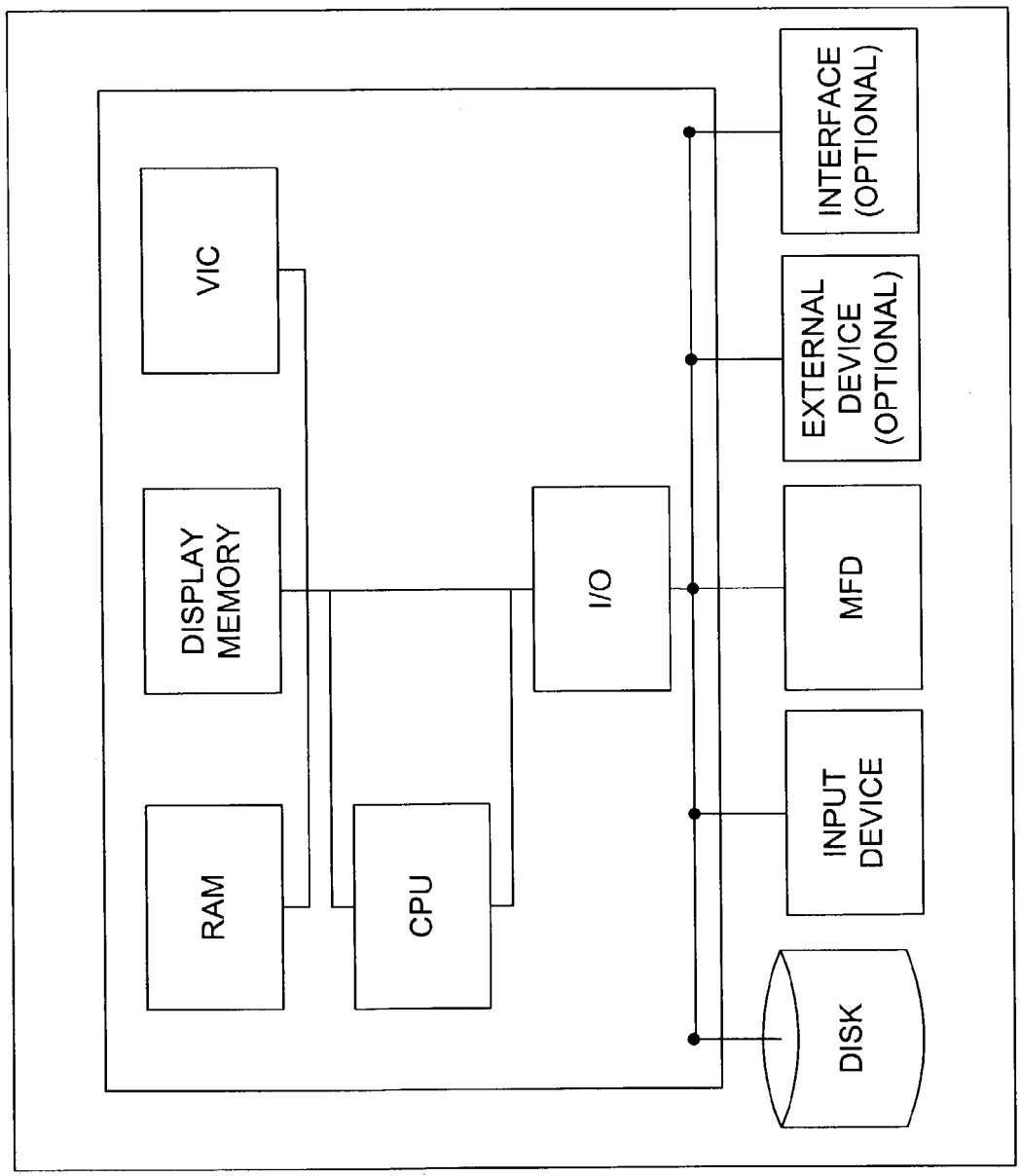
FIG. 9 is a block diagram of one embodiment of a computer for a MFD consistent with the invention, as shown in FIGS. 8A-8B.

FIG. 9 is a block diagram of one embodiment of a computer for a MFD consistent with the invention, as shown in FIGS. 8A-8B. As shown in FIG. 9, in one implementation, a computer 900 includes a processor 905, a disk 910, an input device 915, a MFD 920, an optional external device 925, and an optional interface 930. In this implementation, processor 905 includes a CPU 935, which is connected to a random access memory (RAM) unit 940, a display memory unit 945, a video interface controller (VIC) unit 950, and an input/output (I/O) unit 955. The processor may also include other components.

In this implementation, disk 910, input device 915, MFD 920, optional external device 925, and optional interface 930 are connected to processor 905 via I/O unit 955. In this implementation, disk 910 contains the information that may be processed by processor 905 and displayed on MFD 920. Input device 915 includes the mechanism by which a user may access computer 900. Optional external device 925 allows computer 900 to interact with other devices (not shown). Optional interface 930 allows computer 900 to receive information other than by input device 915. For example, optional interface 930 may be used to receive information which is stored on disk 910. As described above, computer 900 displays information on MFD 920. Other components or devices may also be attached to processor 905 via I/O unit 955. Other computers may also be used (e.g., for redundancy). These configurations are merely exemplary, and other implementations may also be used.

Figure 10:
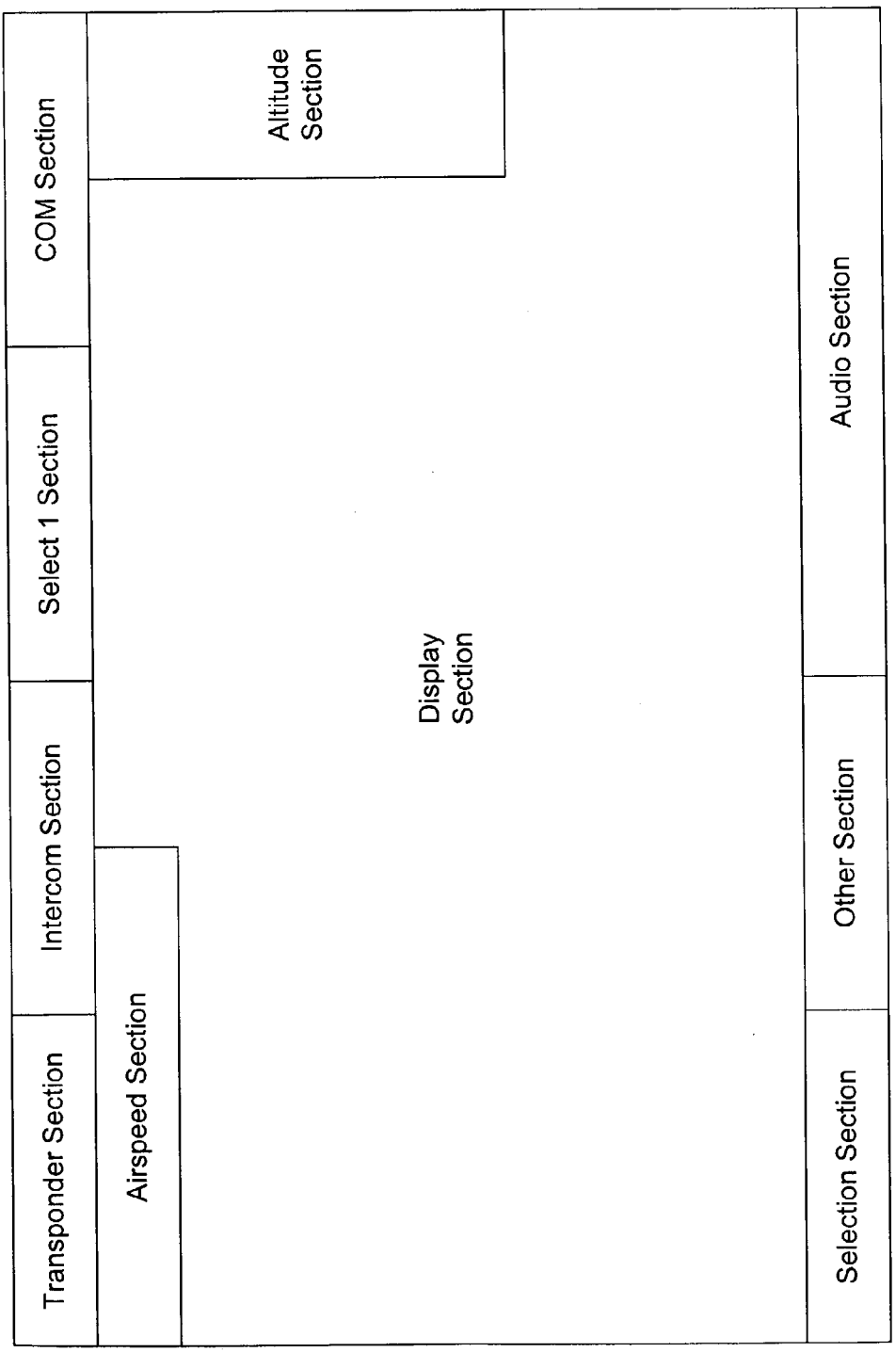
FIG. 10 illustrates one embodiment of a screen format for a MFD consistent with the invention, as shown in FIGS. 8A-8B.

FIG. 10 illustrates one embodiment of a screen format for a MFD consistent with the invention, as shown in FIGS. 8A-8B. As shown in FIG. 10, in one implementation, an MFD screen 1000 includes a display section 1005, a transponder section 1010, an intercom section 1015, a select 1 section 1020, a com section 1025, an audio section 1030, a selection section 1035, an other section 1040, an airspeed section 1045, and an altitude section 1050. As shown in FIG. 10, transponder section 1010, intercom section 1015, select 1 section 1020, and com section 1025 are located at the top of display section 1005. As also shown in FIG. 10, selection section 1035, other section 1040, and audio section 1030 are located at the bottom of display section 1005. Also, airspeed section 1045 is located to the upper left of display section 1005, and altitude section 1050 is located to the upper right of display section 1005. The arrangement of these sections on display section 1005 may be made in any configuration. These configurations are merely exemplary, and other implementations may also be used.

Figure 11:
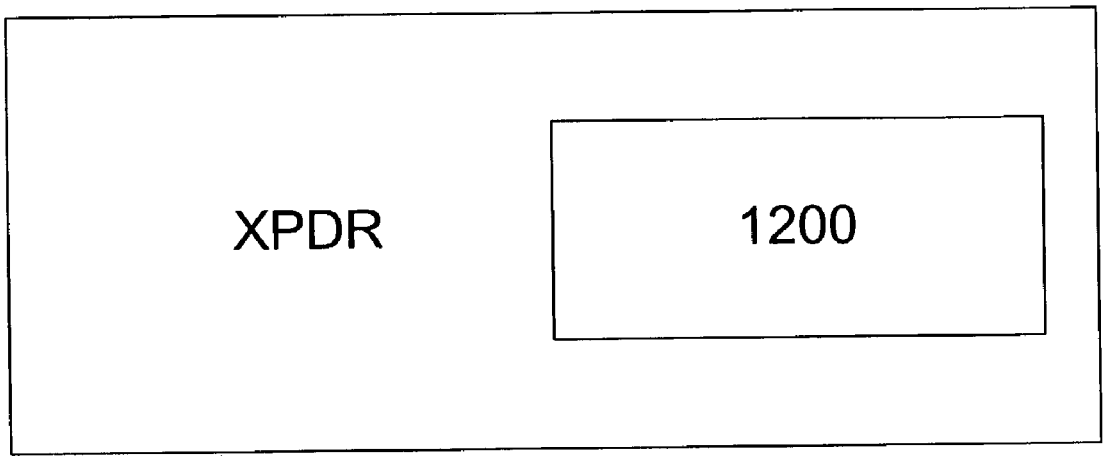
FIG. 11 illustrates one embodiment of a transponder section on a display section on a MFD consistent with the invention, as shown in FIG. 10.

FIG. 11 illustrates one embodiment of a transponder section on a display section on a MFD consistent with the invention, as shown in FIG. 10. As shown in FIG. 11, in this implementation, a transponder section 1100 includes a label section 1120 and an indicator section 1140. Label section 1120 indicates that transponder section 1100 is for a transponder (as described above). As shown in label section 1120, the transponder is indicated as "XPDR." Indicator section 1140 indicates the actual numeric value of the transponder code.

As shown in FIG. 11, a transponder code of 1200 is shown as an example. A transponder code of 1200 indicates that the aircraft is flying according to visual flight rules (VFR). ATC may assign to the aircraft another transponder code that would then be located in the indicator window. The arrangement of label section 1120 and indicator section 1140 in transponder section 1100 is exemplary, and other arrangements may also be used. Other implementations may also be used.

Figure 12:
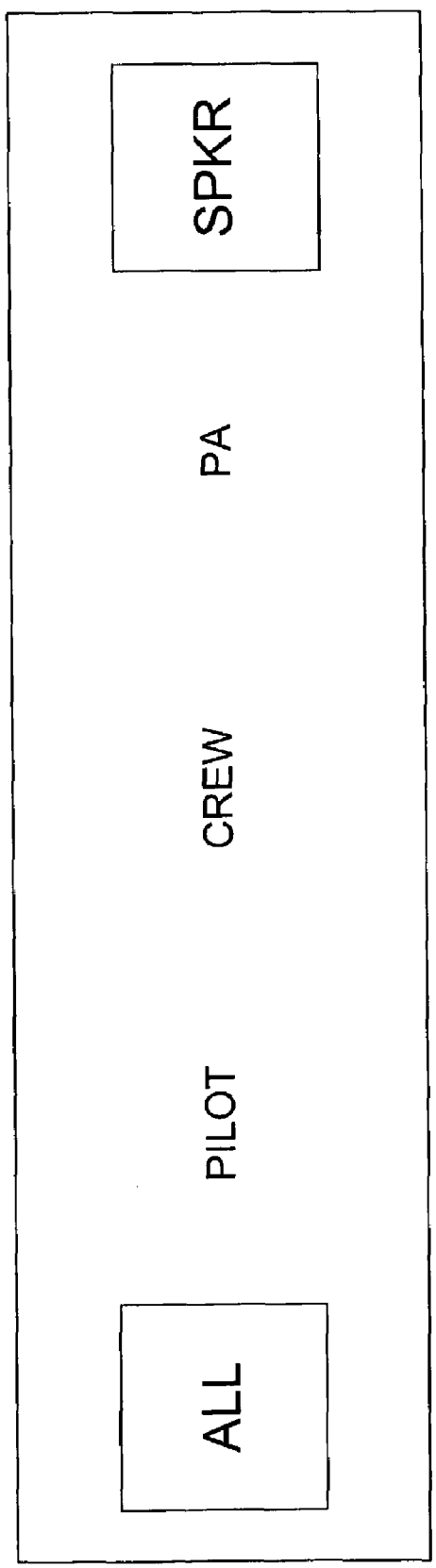
FIG. 12 illustrates one embodiment of an intercom section on a display section on a MFD consistent with the invention, as shown in FIG. 10.

FIG. 12 illustrates one embodiment of an intercom section on a display section on a MFD consistent with the invention, as shown in FIG. 10. As shown in FIG. 12, in one implementation, an intercom section 1200 includes an ALL selection 1210, a PILOT selection 1220, a CREW selection 1230, a PA selection 1240, and a SPEAKER selection 1250 (identified on FIG. 12 as "SPKR"). As described above, the intercom is used by the pilot and the co-pilot to communicate with each other and to communicate with the crew and passengers. Intercom section 1200 allows the pilot and co-pilot to control the intercom. Activation of ALL selection 1210 instructs the intercom to allow all persons to receive communications over the intercom. Activation of PILOT selection 1220 only allows the pilot (which also generally includes the co-pilot) to receive communications over the intercom. Activation of CREW selection 1230 allows the crew to receive communications over the intercom but would not allow other persons (such as passengers) to receive communications over the intercom. Activation of PA selection 1240 would allow the pilot and the co-pilot to address the crew and passengers using a public address (PA) system. Activation of SPEAKER selection 1250 allows the pilot and co-pilot to route communications from the intercom to a speaker. The speaker is usually located in the cockpit and may be used when the use of a headset is not appropriate. The selection of items on intercom section 1200 may be made by the pilot and co-pilot in any manner. For example, intercom section 1200 may be a touch screen on the MFD. Alternatively, there may be buttons located on or near the MFD that the pilot and co-pilot may be able to use to make selections. Activation of a particular selection may be indicated on the display, such as, for example, displaying a square border around the activated selection, as shown in FIG. 12 for ALL selection 1210 and SPKR selection 1250. These examples are merely explanatory, and other implementations may also be used.

Figure 13A:
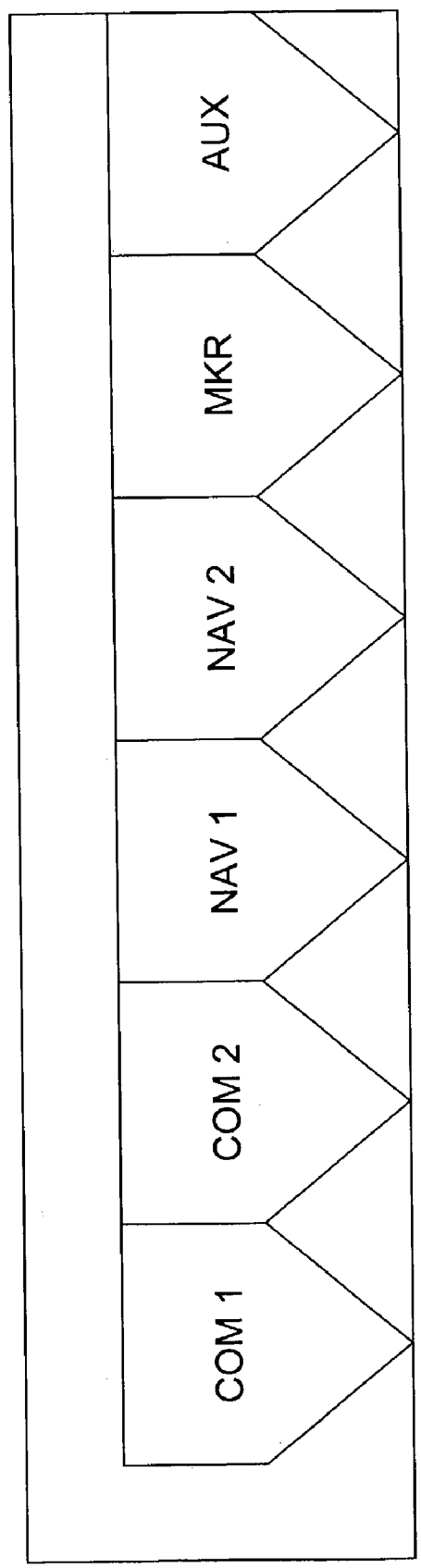
FIG. 13A illustrates one embodiment of an audio section on a display section on a MFD consistent with the invention, as shown in FIG. 10.

FIG. 13A illustrates one embodiment of an audio section on a display section on a MFD consistent with the invention, as shown in FIG. 10. As shown in FIG. 13A, in one implementation, an audio section 1300 includes a COM 1 selection 1305, a COM 2 selection 1310, a NAV 1 selection 1315, a NAV 2 selection 1320, a MKR selection 1325, and a AUX selection 1330. COM 1 selection 1305 is configured to a first communication device. COM 2 selection 1310 is configured to a second communication device. NAV 1 selection 1315 is configured to a first navigational device. NAV 2 selection 1320 is configured to a second navigational device. MKR selection 1325 is configured to a marker beacon. AUX selection 1330 is configured to an auxiliary unit (such as, for example, an FM broadcast radio, a compact disc (CD) player, or any other unit). A pilot and co-pilot may make selections on audio section 1300 in an appropriate manner, such as by a touchscreen. Once a selection is made, computer 820 (FIG. 8A) processes the selection and provides the information to the pilot and co-pilot via the MFD. Additionally, selections made in audio section 1300 will affect the output in the select 1 selection and in the COM section (as described below in FIGS. 14A-14B). This configuration and use of audio section 1300 is merely exemplary, and other implementations may also be used.

Figure 13B:
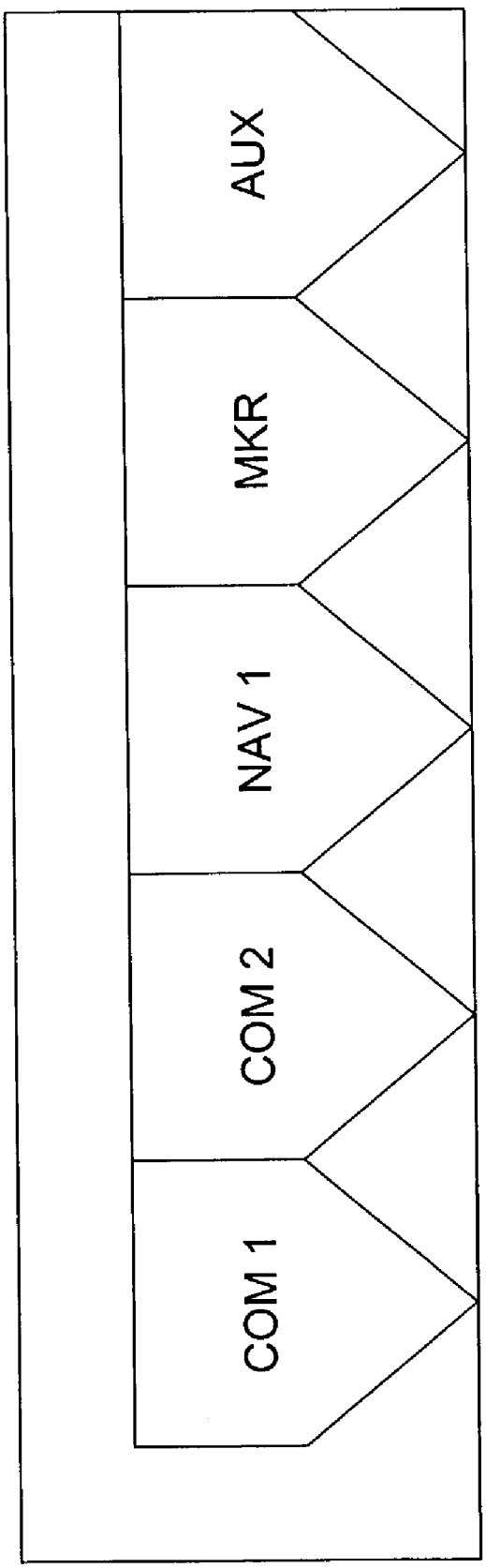
FIG. 13B illustrates another embodiment of an audio section on a display section on a MFD consistent with the invention, as shown in FIG. 10.

FIG. 13B illustrates another embodiment of an audio section on a display section on a MFD consistent with the invention, as shown in FIG. 10. As shown in FIG. 13B, in one implementation, an audio section 1350 includes a COM 1 selection 1305, a COM 2 selection 1310, a NAV 1 selection 1315, a MKR selection 1325, and an AUX selection 1330. The selections in audio section 1350 in FIG. 13B are similar to the selections in audio section 1300 in FIG. 13A, except audio section 1350 does not have NAV 2 selection 1320 FIG. 13B further illustrates the fact that audio section 1350 may have any configuration of selection capabilities. Thus, the configuration and use of selections in FIG. 13B are also merely exemplary, and other implementations may also be used.

Figure 14A:
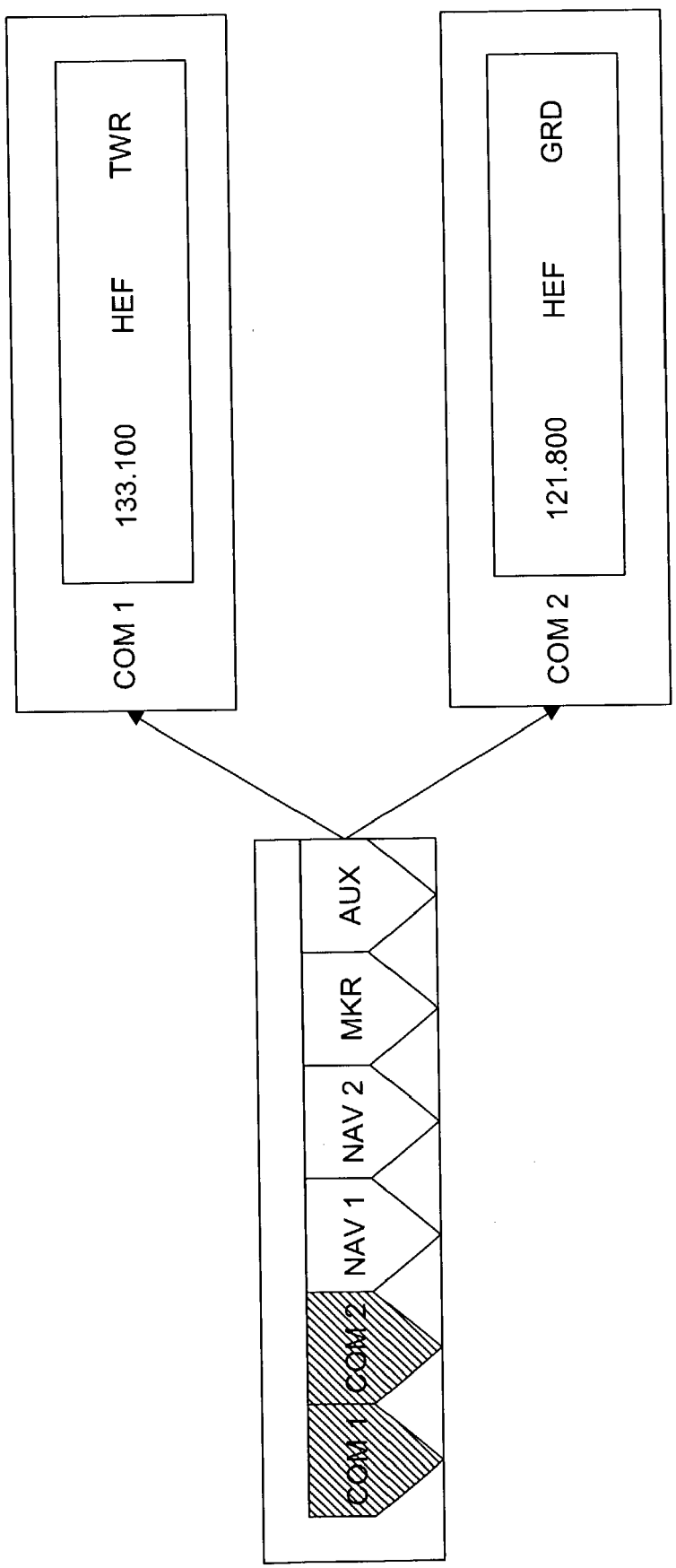
FIG. 14A illustrates an embodiment of a select 1 section and a com section on a display section on a MFD consistent with the invention, as shown in FIG. 10.

FIG. 14A illustrates an embodiment of a select 1 section and a com section on a display section on a MFD consistent with the invention, as shown in FIG. 10. As shown in FIG. 14A, in one implementation, a select 1 section 1405 and a com section 1420 include label sections 1410 and 1425 and indicator sections 1415 and 1430. As shown in FIG. 14A, select 1 section 1405 reflects the selection made on an audio section 1435, as described in FIGS. 13A-13B. Similarly, com section 1420 also reflects the selection made on audio section 1435, as shown in FIGS. 13A-13B. Thus, as shown in FIG. 14A, because "COM 1" has been selected on audio section 1435, label section 1410 on select 1 section 1405 shows "COM 1", and because "COM 2" has been selected on audio section 1435, label section 1425 on com section 1420 shows "COM 2." In this implementation, label selections 1420 and 1425 indicate the selected mode, in this case "COM 1" for select 1 section 1405 and "COM 2" for com section 1420.

Indicator sections 1415 and 1430 show what has been selected by the pilot and co-pilot. In this case, as shown in FIG. 14A, indicator section 1415 of select 1 section 1405 shows a communication frequency of 133.100. Additionally, indicator section 1415 may also automatically indicate the location for the frequency, e.g., in this case, the frequency of 133.100 corresponds to an airport at HEF (which is the airport destination for Manassas, Va.), and the frequency of 133.100 corresponds to the tower frequency at this airport (i.e., "TWR"). Similarly, indicator section 1430 of com section 1420 shows a communication frequency of 121.800. In this case, indicator section 1430 may also automatically indicate the location for the frequency, e.g., in this case, the frequency of 121.800 corresponds to the airport designation of HEF for Manassas, Va., and the frequency of 121.800 corresponds to the ground frequency at this airport (thus "GRD"). Thus, the information depicted in select 1 section 1405 and in com section 1420 depends upon the selections from the nav/com section. These examples are merely exemplary, and other implementations may also be used.

Figure 14B:
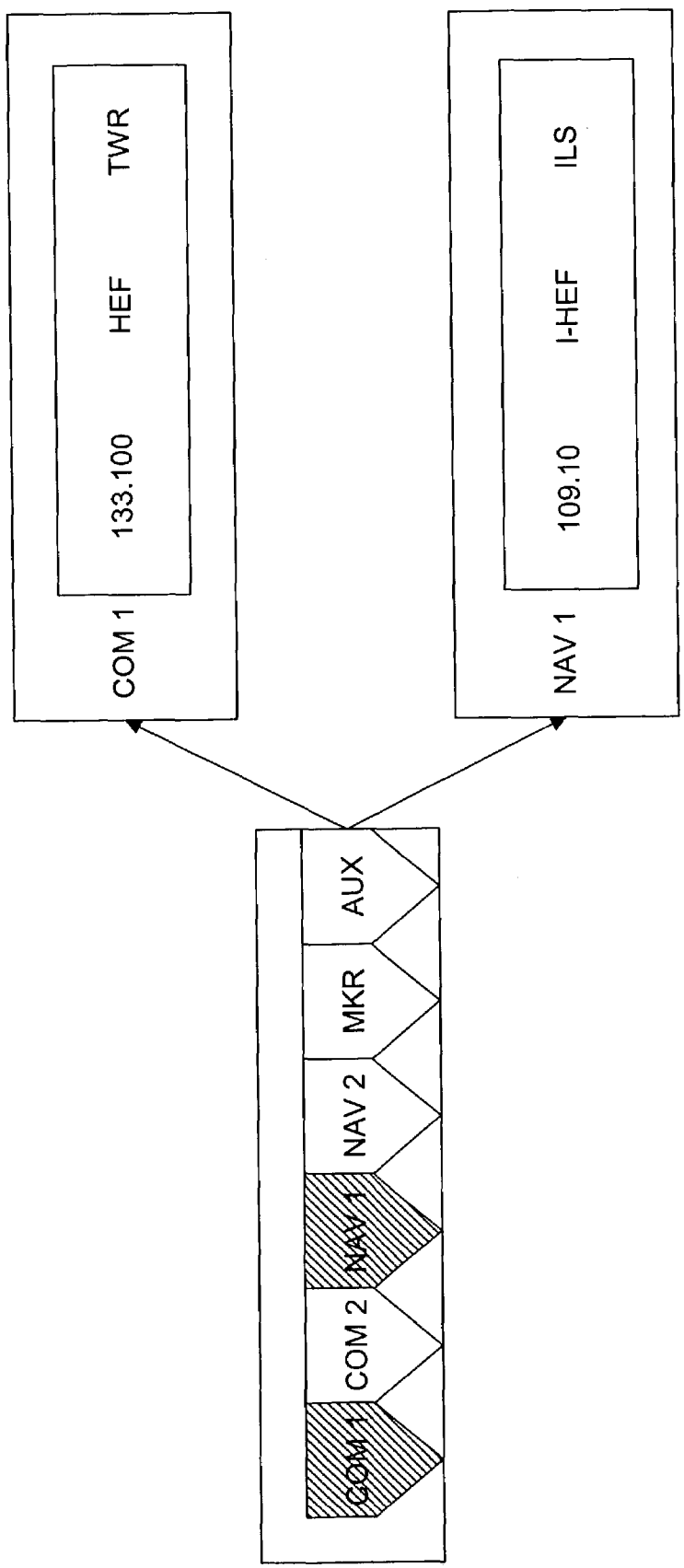
FIG. 14B illustrates another embodiment of a select 1 section and a com section in a display section on a MFD consistent with the invention, as shown in FIG. 10.

FIG. 14B illustrates another embodiment of a select 1 section and a com section in a display section on a MFD consistent with the invention, as shown in FIG. 10. As shown in FIG. 14B, in one implementation, the selections in FIG. 14B are similar to the selections in FIG. 14A, except FIG. 14B reflects different selections on audio section 1435. As shown in FIG. 14B, because the "COM 1" has been selected on audio section 1435, label section 1410 on select 1 section 1405 shows "COM 1," and because "NAV 1" has been selected on the audio section 1435, label section 1425 of the com section 1420 shows "NAV 1." In this implementation, label sections 1410 and 1425 indicate the selected mode, in this case "COM 1" for select 1 section 1405 and "NAV 1" for com section 1420. In this case, as shown in FIG. 14B, select 1 section 1405 shows the same communication selection as shown in FIG. 14A. Additionally, com section 1420 shows a navigation frequency of 109.10. Indicator section 1430 may also automatically indicate the source for the frequency, e.g., in this case, the frequency of 109.10 corresponds to a ILS system at HEF (i.e., "I-HEF"), and the frequency of 109.10 corresponds to the ILS (i.e., "ILS"). Thus, the information depicted in select 1 section 1405 and in com section 1420 depends upon the selections from audio section 1435, as in FIG. 14A. These examples are merely exemplary, and other implementations may also be used.

Figure 15:
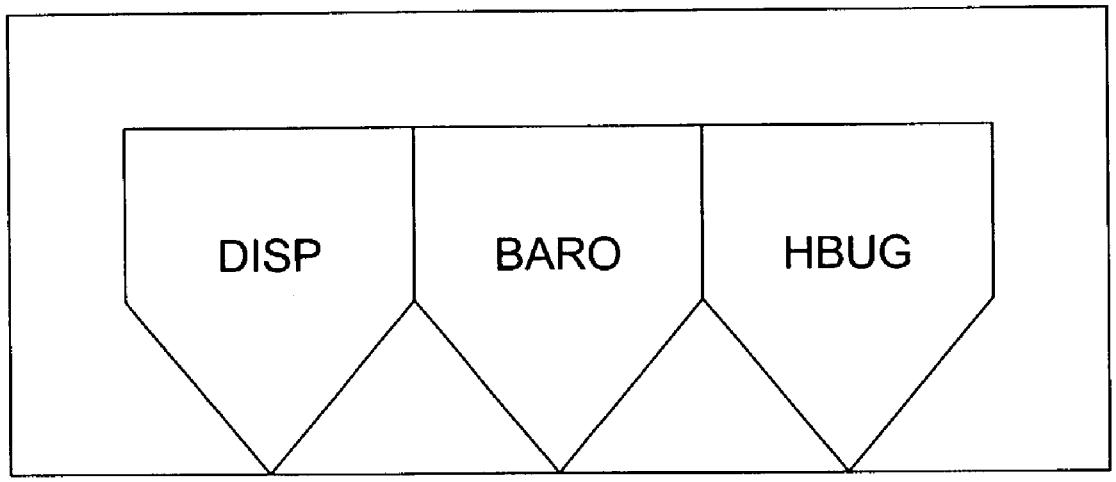
FIG. 15 illustrates a selection section on a display section on a MFD consistent with the invention, as shown in FIG. 10.

FIG. 15 illustrates a selection section on a display section on a MFD consistent with the invention, as shown in FIG. 10. As shown in FIG. 15, in one implementation, a selection section 1500 includes a DISP selection 1520, a BARO selection 1540, and a HBUG selection 1560. DISP selection 1520 is a selection for a display. For example, the selection of DISP selection 1520 may indicate to the computer that the pilot and co-pilot desire a certain type of display on the display section on the MFD. Additional selections may also be windowed above, below, or under DISP selection 1520. These additional selection options may allow the pilot and co-pilot to obtain other display indications on the display section on the MFD.

BARO selection 1540 is for the selection of a barometric setting. As referenced above, the altimeter may be adjusted according to the current barometric pressure. In this implementation, a pilot and co-pilot uses BARO selection 1540 to input a barometric pressure setting to the MFD, as described in more detail below in FIG. 17.

HBUG selection 1560 is a selection that allows the pilot and co-pilot to reference a heading bug (HBUG). The heading bug is an indicator on the heading indicator (or HSI), which allows the pilot and co-pilot to provide a heading to the MFD. Other selections may also be available on the selection section (not shown). These examples are merely exemplary, and other implementations may also be used.

Figure 16:
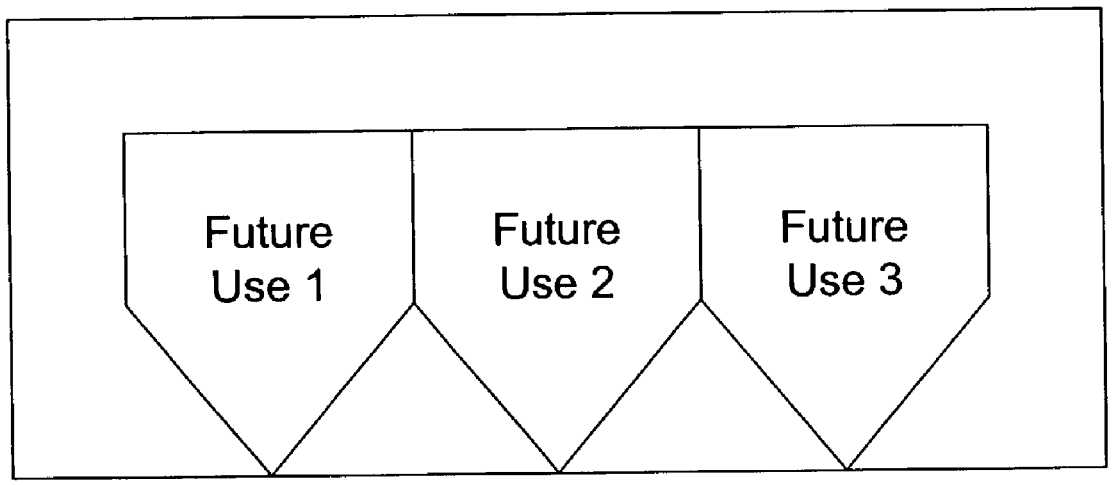
FIG. 16 illustrates an other section on a display section on a MFD consistent with the invention, as shown in FIG. 10.

FIG. 16 illustrates an other section on a display section on a MFD consistent with the invention, as shown in FIG. 10. As shown in FIG. 16, in one implementation, an other section 1600 includes a future use 1 selection 1620, a future use 2 selection 1640, and a future use 3 selection 1660. Other future uses selections may also be used. Future use 1 selection 1620, future use 2 selection 1640, and future use 3 selection 1660, as well as any other future use selections (not shown), may be used for future uses in the MFD, as shown in FIG. 10. Future uses in the MFD may include, but are not limited to: selecting a calibration procedure for the aircraft; inputting aircraft limitations; and displaying an infrared view. The selections in the other section (as well as in all of the sections on the MFD) are exemplary, and other implementations may also be used.

Figure 17:
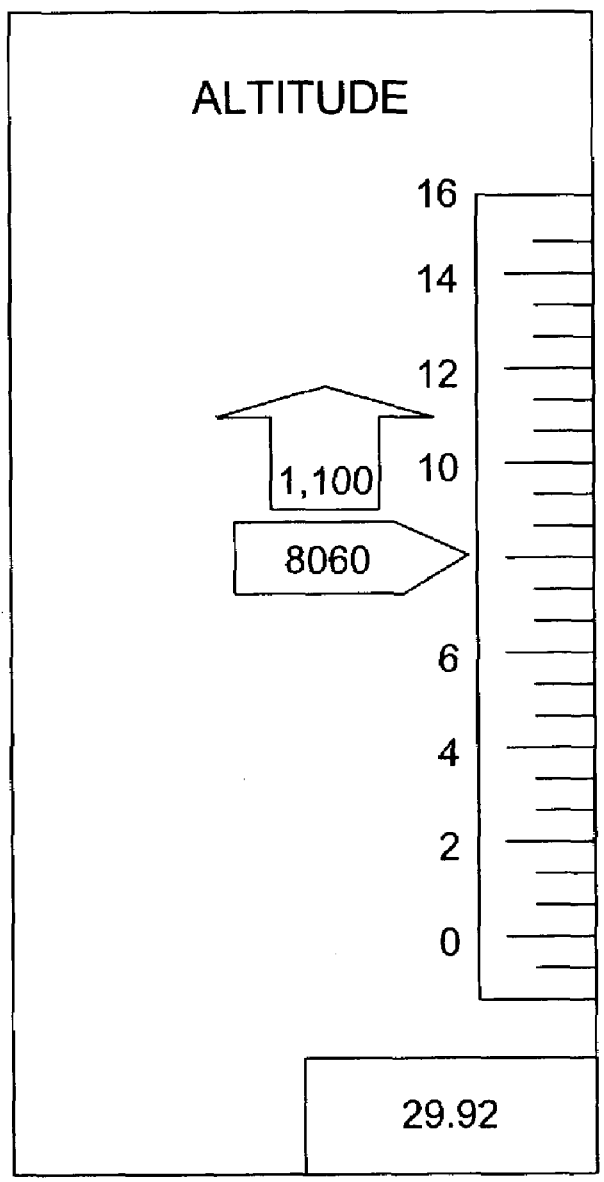
FIG. 17 is one embodiment of an altitude section on a display section on a MFD consistent with the invention, as shown in FIG. 10.

FIG. 17 is one embodiment of an altitude section on a display section on a MFD consistent with the invention, as shown in FIG. 10. As shown in FIG. 17, in one implementation, an altitude section 1700 includes an altitude tape 1720, an altitude indicator 1740, a vertical speed indicator 1760, and a Kollsman window 1780. Altitude tape 1720 is a reference line for the altitude of the aircraft. As shown in FIG. 17, altitude tape 1720 ranges from 0-16, which represents the altitude at sea level to 16,000 ft. Altitude indicator 1740 points to the altitude of the aircraft on altitude tape 1720. In addition, altitude indicator 1740 also contains the current altitude rounded to the nearest ten feet, for example. Altitude indicator 1740 in FIG. 17 depicts an altitude of 8,060 ft. In one implementation, altitude tape 1720 remains stationary while altitude indicator 1740 moves as the aircraft climbs and descends. In another implementation, altitude tape 1720 may move relative to the altitude of the aircraft while altitude indicator 1740 remains stationary.

Vertical speed indicator 1760 shows the rate at which the aircraft is climbing or descending. For example, as shown in FIG. 17, vertical speed indicator 1760, located above altitude indicator 1740, shows that the aircraft is climbing at a rate of 1,100 ft per minute. Kollsman window 1780 references the current barometric pressure, which may be selected by the pilot and co-pilot. As referenced in FIG. 15, the BARO selection in the selection section allows a pilot and co-pilot to adjust the barometric pressure, which appears in Kollsman window 1780 on altitude section 1700. All of the components in altitude section 1700 are exemplary, and other implementations may also be used.

Figure 18:
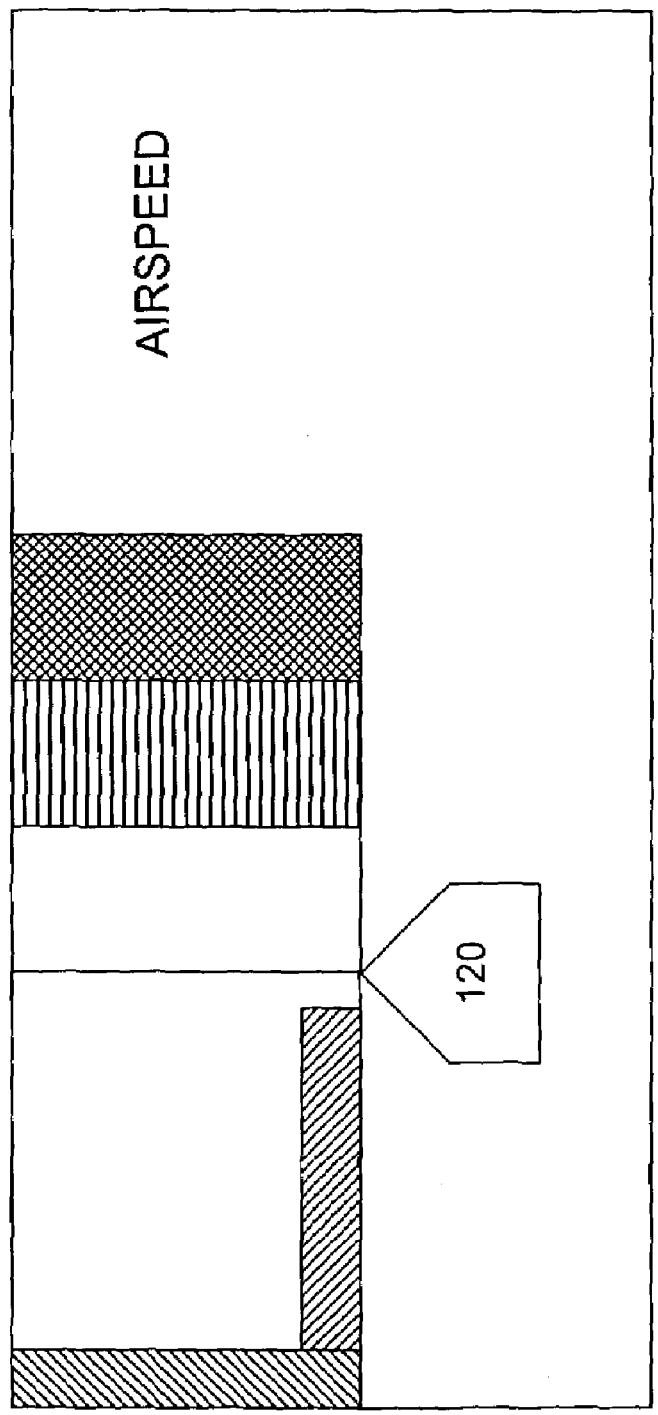
FIG. 18 illustrates an airspeed section on a display section on a MFD consistent with the invention, as shown in FIG. 10.

FIG. 18 illustrates an airspeed section on a display section on a MFD consistent with the invention, as shown in FIG. 10. As shown in FIG. 18, in one implementation, an airspeed section 1800 includes an airspeed ribbon 1810 and an airspeed indicator 1820. Airspeed ribbon 1810 depicts a range of airspeeds for the aircraft, from 0 to a top speed for the aircraft.

Within airspeed ribbon 1810, additional indicators may also be provided. For example, as shown in FIG. 18, airspeed ribbon 1810 includes a stall speed range 1830, a flaps extension range 1840, a yellow arc 1850, and a red arc 1860. Stall speed range 1830 is a range of speeds at which the aircraft will stall, because the speed of the aircraft is too slow to produce lift. Flaps extension range 1840 is a range of airspeeds in which a pilot or co-pilot may extend flaps without causing any damage to the aircraft.

Yellow arc 1850 is a range of airspeeds in which caution should be given during periods of turbulence. The lowest point on the range of yellow arc 1850 is known as the maneuvering speed. For example, if an aircraft encounters turbulence, the aircraft should slow to a speed at or below a speed in yellow arc 1850, that is, a speed at maneuvering speed or below. Red arc 1860 indicates a speed at which damage may be caused to the aircraft.

Airspeed indicator 1820 is depicted below airspeed ribbon 1810. Airspeed indicator 1820 points to the current speed of the aircraft. Airspeed indicator 1820 also has a line 1870 that extends from the bottom of airspeed ribbon 1810 to the top of the airspeed ribbon 1810. In addition airspeed indicator 1820 may also have the current airspeed indicated numerically within airspeed indicator 1820. All of the components of airspeed section 1800 are exemplary, and other implementations may also be used.

Figure 19A:
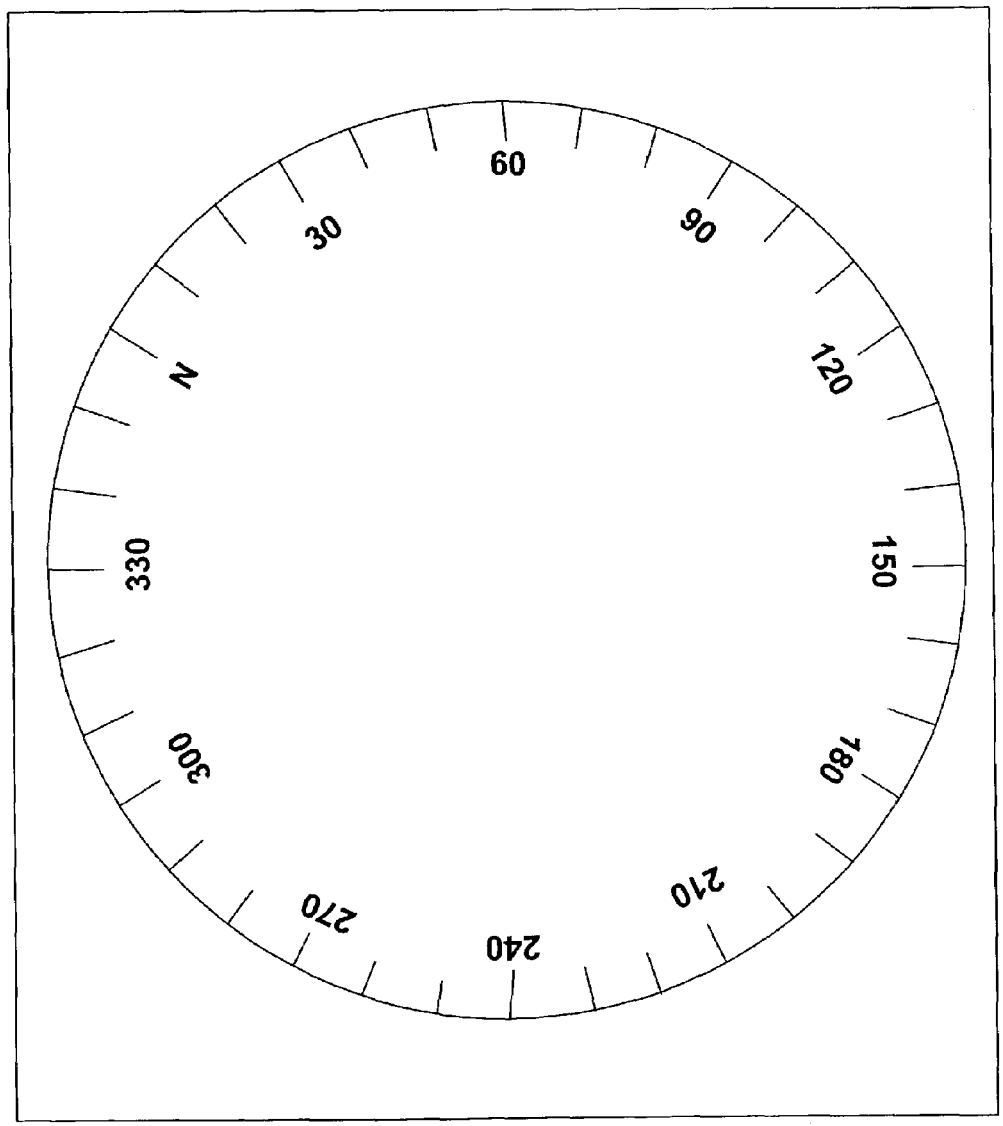
FIG. 19A illustrates one embodiment of flight information on a display section on a MFD consistent with the invention, as shown in FIG. 10.

FIG. 19A illustrates one embodiment of flight information on a display section on a MFD consistent with the invention, as shown in FIG. 10. As shown in FIG. 19A, in one implementation, a display section 1900 includes a heading indicator 1901. In this implementation, heading indicator 1901 fills most of the display section extending almost to the top and bottom of display section 1900, and also extending almost to the left and to the right sides of display section 1900. In this implementation, heading indicator 1901 comprises a compass rose 1902. Also, as shown in FIG. 19A, the heading indicator indicates a heading of 330° on compass rose 1902. The example shown in FIG. 19A is exemplary, and other implementations may also be used.

Figure 19B:
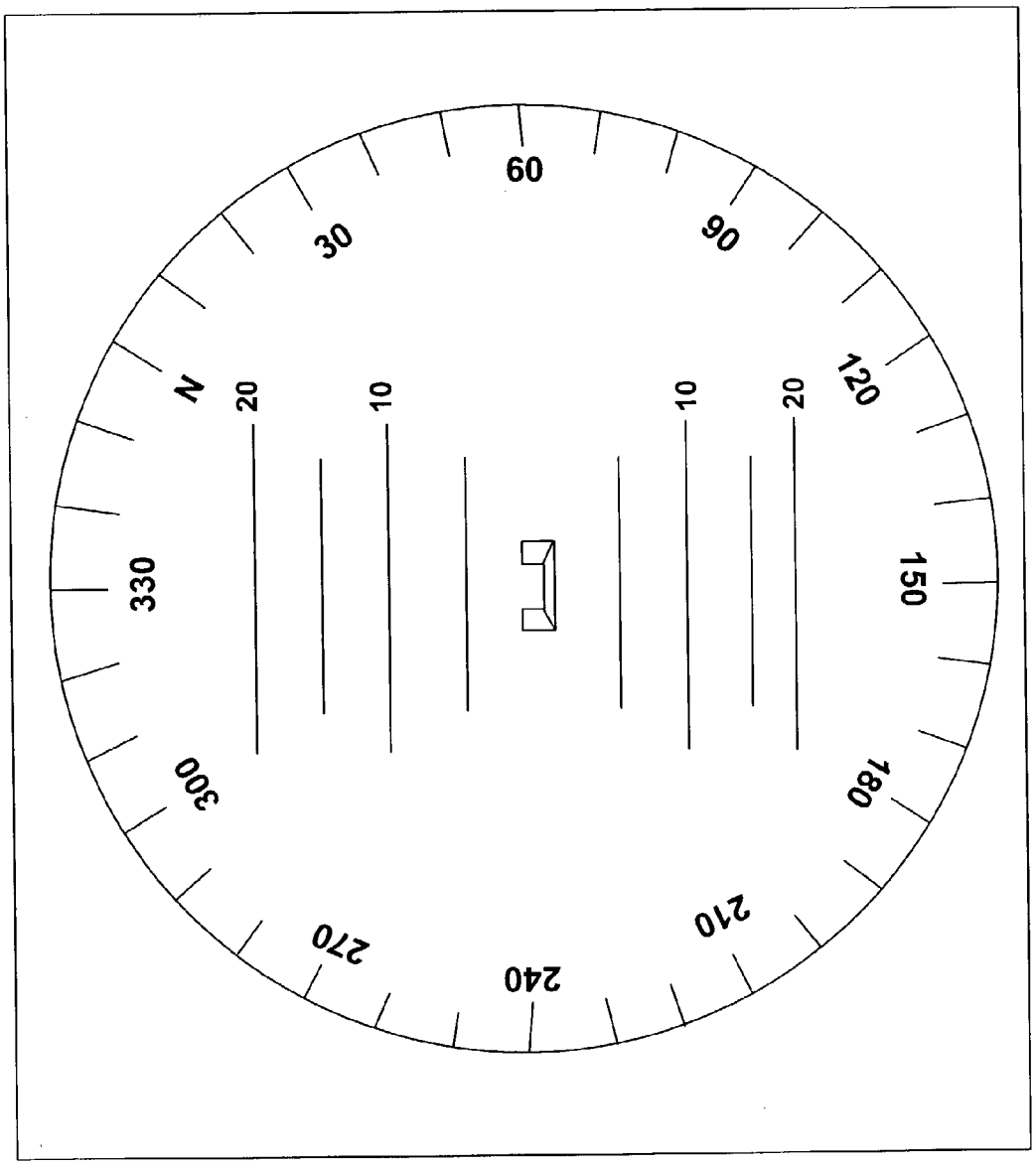
FIG. 19B illustrates another embodiment of flight information on a display section on a MFD consistent with the invention, as shown in FIG. 19A.

FIG. 19B illustrates another embodiment of flight information on a display section on a MFD consistent with the invention, as shown in FIG. 19A. As shown in FIG. 19B, in one implementation, display section 1900 includes heading indicator 1901 and an attitude indicator 1903. In this implementation, heading indicator 1901 shown in FIG. 19B is the same as heading indicator 1901 shown in FIG. 19A.

FIG. 19B also comprises attitude indicator 1903, which has a center reference 1904, up pitch indications 1905, and down pitch indications 1906. Center reference 1904 is in the shape of a targeting wedge. Up pitch indications 1905 include a 5° up pitch indication, a 10° up pitch indication, a 15° up pitch indication, and a 20° up pitch indication. Down pitch indications 1906 include a 5° pitch down indication, a 10° pitch down indication, a 15° pitch down indication, and a 20° pitch down indication. In this implementation, attitude indicator 1903 is positioned within heading indicator 1901. The example shown in FIG. 19B is exemplary, and other implementations may also be used.

Figure 19C:
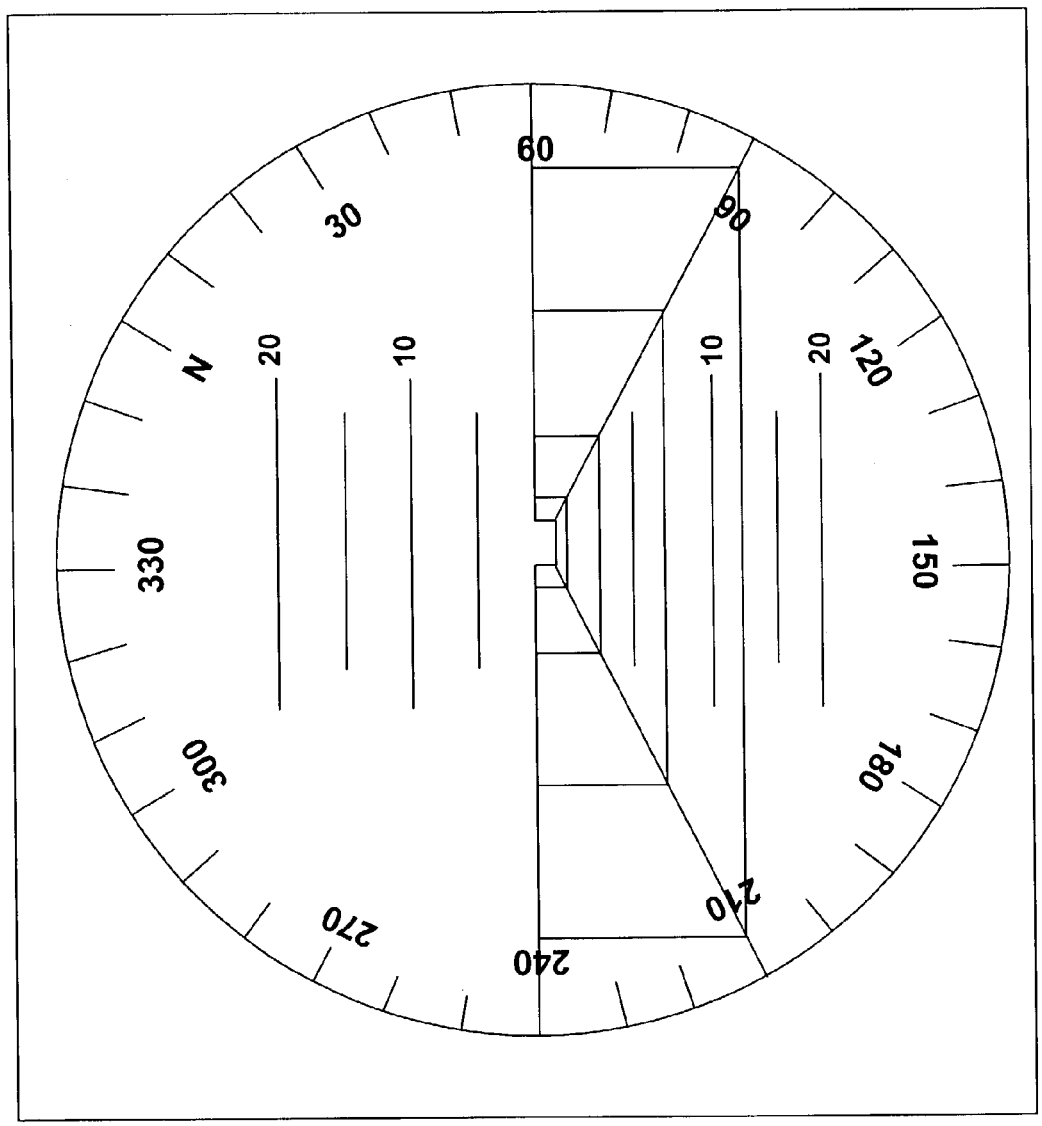
FIG. 19C illustrates another embodiment of flight information on a display section on a MFD consistent with the invention, as shown in FIG. 19B.

FIG. 19C illustrates another embodiment of flight information on a display section on a MFD consistent with the invention, as shown in FIG. 19B. As shown in FIG. 19C, in one implementation, display section 1900 includes heading indicator 1901, attitude indicator 1903, and a highway-in-the-sky (HITS) indicator 1907. In this implementation, heading indicator 1901 and attitude indicator 1903 are the same as in FIGS. 19A-19B.

FIG. 19C also comprises HITS indicator 1907, which depicts an intended course of flight for the aircraft. HITS indicator 1907 is based on information from any of the known HITS technologies. Alternatively, instead of HITS indicator 1907, a flight director indicator (not shown) may also be used to indicate an intended course of flight for the aircraft. The flight director indicator is based on any of the navigational devices. The example shown in FIG. 19C is exemplary, and other implementations may also be used.

Figure 19D:
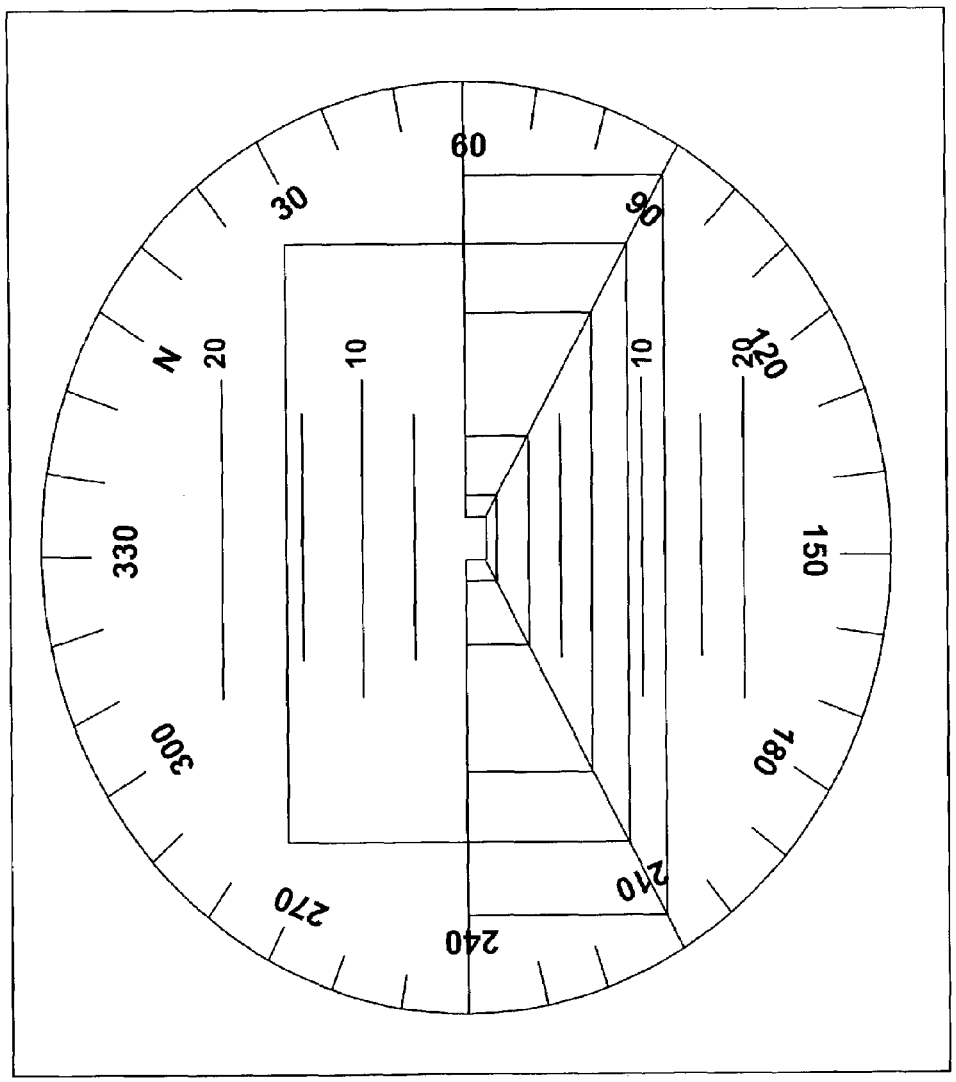
FIG. 19D illustrates another embodiment of flight information on a display section on a MFD consistent with the invention, as shown in FIG. 19C.

FIG. 19D illustrates another embodiment of flight information on a display section on a MFD consistent with the invention, as shown in FIG. 19C. As shown in FIG. 19D, in one implementation, display section 1900 includes heading indicator 1901, attitude indicator 1903, HITS indicator 1907, and a reference frame 1908. In this implementation, heading indicator 1901, attitude indicator 1903, and HITS indicator 1907 are the same as in FIGS. 19A-19C.

FIG. 19D also comprises reference frame 1908, which provides a reference for a pilot and co-pilot when flying an intended course. In this implementation, reference frame 1908 remains stationary to the heading, but other flight information (such as, for example, HITS indicator 1907) may move with respect to the reference frame. Other configurations may also be used. Indeed, the example shown in FIG. 19D is exemplary, and other implementations may also be used.

Figure 19E:
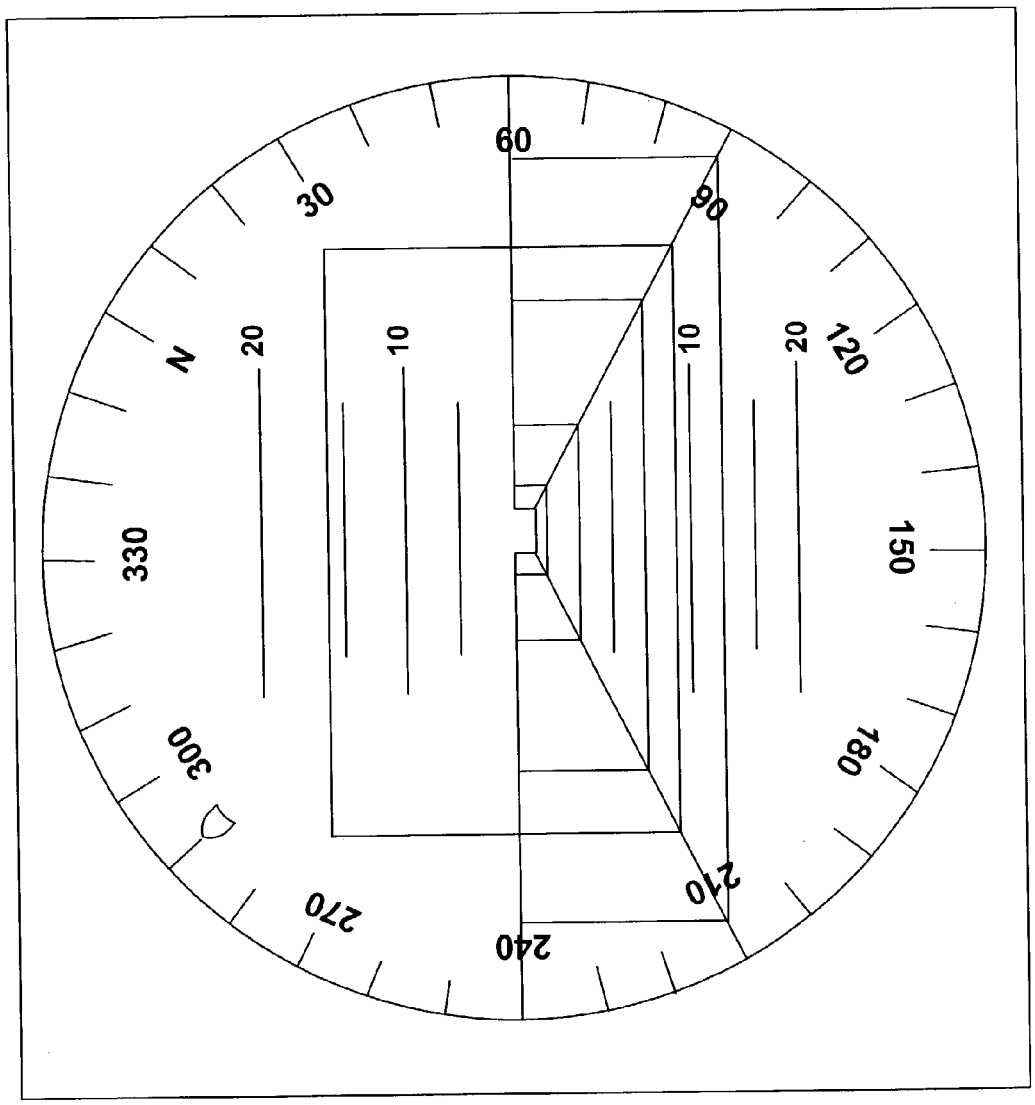
FIG. 19E illustrates another embodiment of flight information on a display section on a MFD consistent with the invention, as shown in FIG. 19D.

FIG. 19E illustrates another embodiment of flight information on a display section on a MFD consistent with the invention, as shown in FIG. 19D. As shown in FIG. 19E, in one implementation, display section 1900 includes a heading indicator 1901, attitude indicator 1903, HITS indicator 1907, reference frame 1908, and a heading bug 1909. In this implementation, heading indicator 1941, attitude indicator 1942, HITS indicator 1943, and reference frame 1944 are the same as in FIGS. 19A-19D.

FIG. 19E also comprises heading bug 1909. The pilot or co-pilot may adjust heading bug 1909 to select an intended heading for the aircraft. An adjustment to heading bug 1909 may be made via the HBUG selection on the selection section, as described in FIG. 15. Other heading bugs may also be used (not shown). The example shown in FIG. 19E is exemplary, and other implementations may also be used.

Figure 19F:
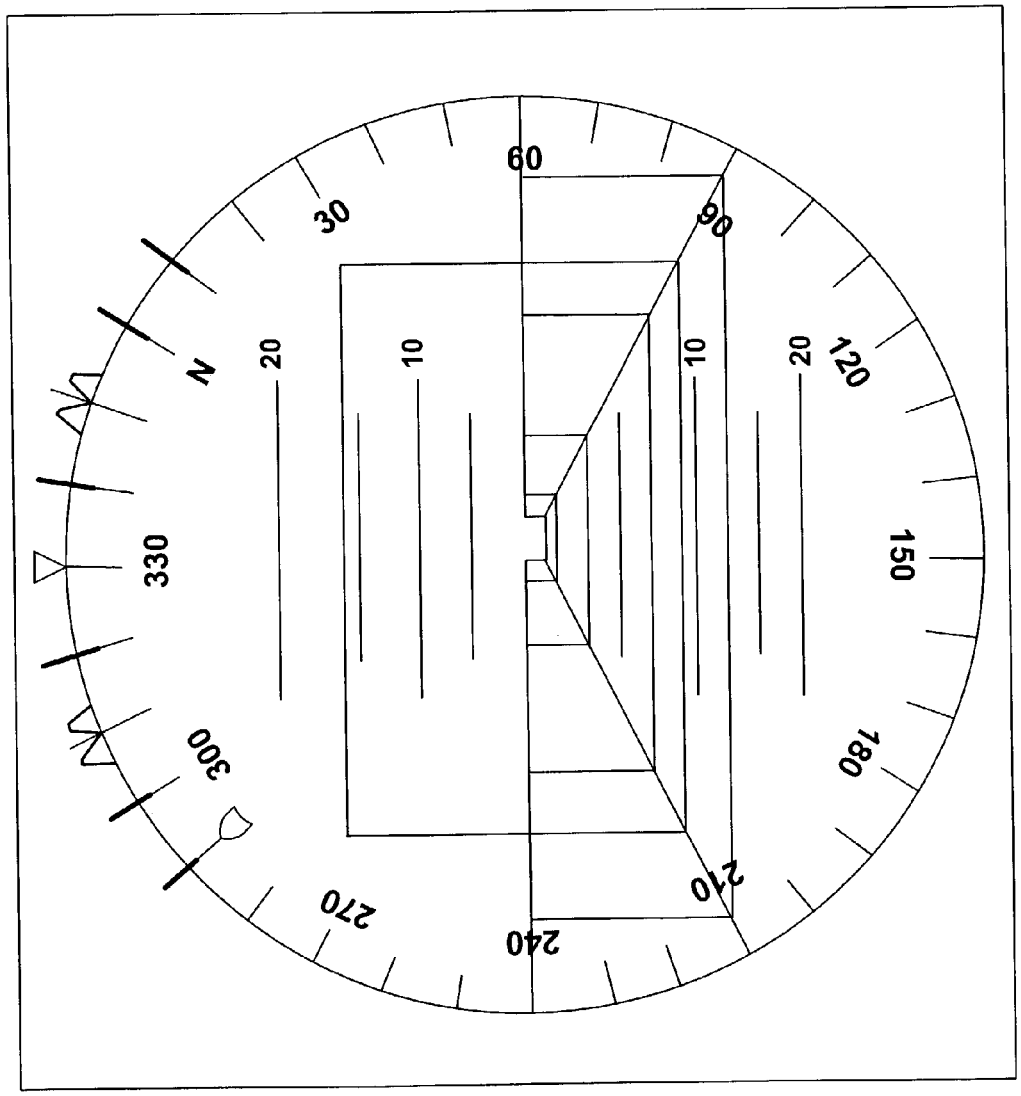
FIG. 19F illustrates another embodiment of flight information on a display section on a MFD consistent with the invention, as shown in FIG. 19E.

FIG. 19F illustrates another embodiment of flight information on a display section on a MFD consistent with the invention, as shown in FIG. 19E. As shown in FIG. 19F, in one implementation, display section 1900 includes heading indicator 1901, attitude indicator 1903, HITS indicator 1907, reference frame 1908, heading bug 1909, left bank angle indications 1910, right bank angle indications 1911, and rate indications 1912. In this implementation, heading indicator 1901, attitude indicator 1903, HITS indicator 1907, reference frame 1908, and heading bug 1909 are the same as in FIGS. 19A-19E.

FIG. 19F also comprises left bank angle indications 1910, right bank angle indications 1911, and rate indications 1912. Left bank angle indications 1910 include a first left bank angle indication 1913, a second left bank angle indication 1914, a third left bank angle indication 1915, and a fourth left bank angle indication 1916. Right bank angle indications 1911 include a first right bank angle indication 1917, a second right bank angle indication 1918, a third right bank angle indication 1919, and a fourth right bank angle indication 1920.

As also shown in FIG. 19F, the left turn rate indication and the right turn rate indication may be depicted as "doghouse indications" 1912. Doghouse indications 1912 for the left turn rate indication and the right rate indication are generally used to describe a standard rate turn of two minutes for 360 degrees. Of course, other rate indications may also be used, and other symbols may also be used to depict any of these rate indications. The example shown in FIG. 19F is exemplary, and other implementations may also be used.

Figure 19G:
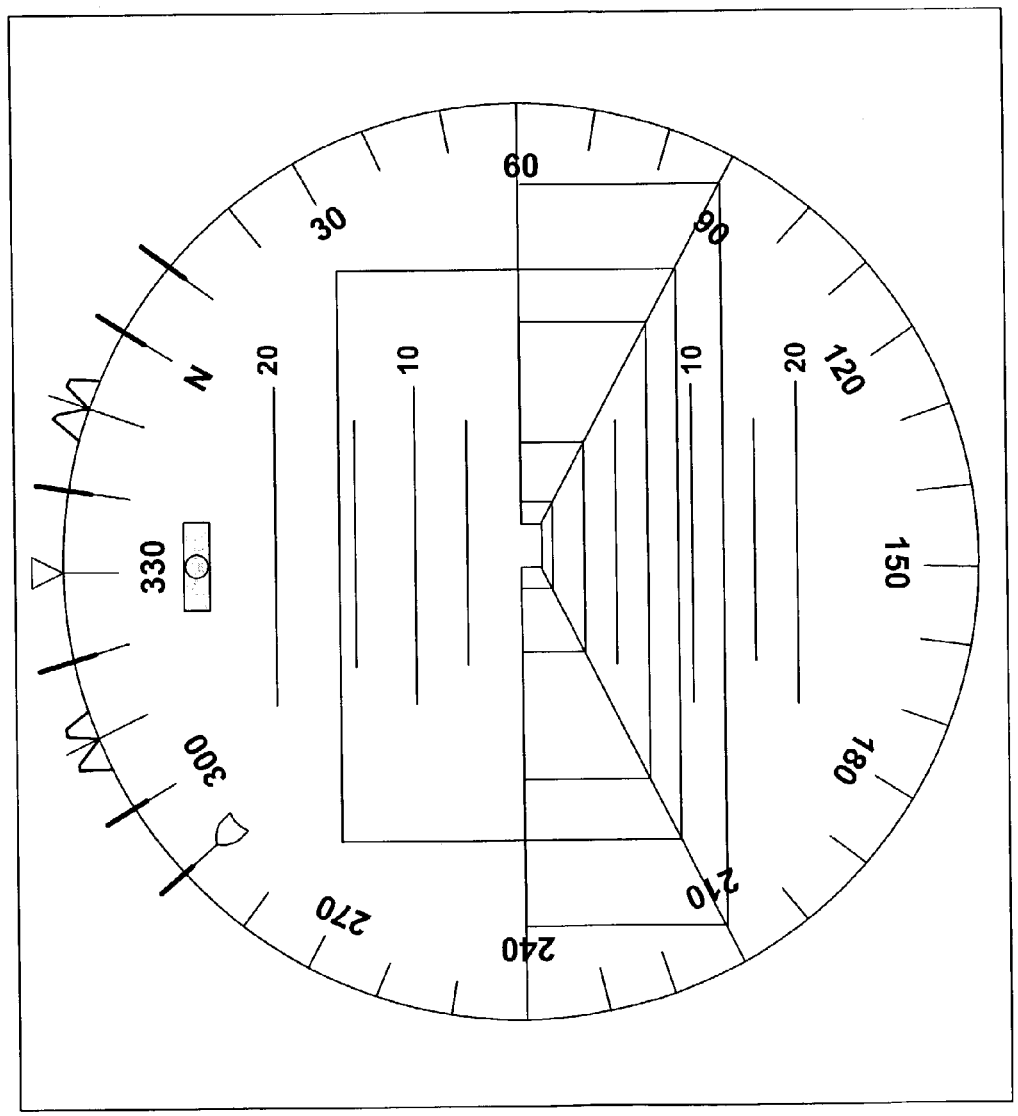
FIG. 19G illustrates another embodiment of flight information on a MFD consistent with the invention, as shown in FIG. 19F.

FIG. 19G illustrates another embodiment of flight information on a MFD consistent with the invention, as shown in FIG. 19F. As shown in FIG. 19G, in one implementation, display section 1900 includes heading indicator 1901, attitude indicator 1903, HITS indicator 1907, reference frame 1908, heading bug 1909, left bank angle indications 1910, right bank angle indications 1911, rate indications 1912, and an electronic inclinometer 1921. In this implementation, heading indicator 1901, attitude indicator 1903, HITS indicator 1907, reference frame 1908, heading bug 1909, left bank angle indications 1910, right bank angle indications 1911, and rate indications 1912 are the same as in FIGS. 19A-19F.

FIG. 19G also comprises electronic inclinometer 1921, which provides slip information to a pilot and co-pilot. In a turn, the pilot and co-pilot generally wish to avoid any slip, and electronic inclinometer 1921 provides this information. A standard inclinometer is a ball in a curved glass tube filled with kerosene, but in this implementation, electronic inclinometer 1921 is provided directly on the display section of the MFD. In this implementation, inclinometer 1921 is located directly under the numerical indication for the heading on heading indicator 1971. But inclinometer 1921 may be located anywhere on the MFD. Inclinometer 1921 may also be attached to the MFD separately. Electronic inclinometer 1921 is just one of the many examples of other components, subcomponents, or other indicators that may be depicted on display section 1900 of the MFD. Indeed, the example shown in FIG. 19G is exemplary, and other implementations may also be used.

Figure 19H:
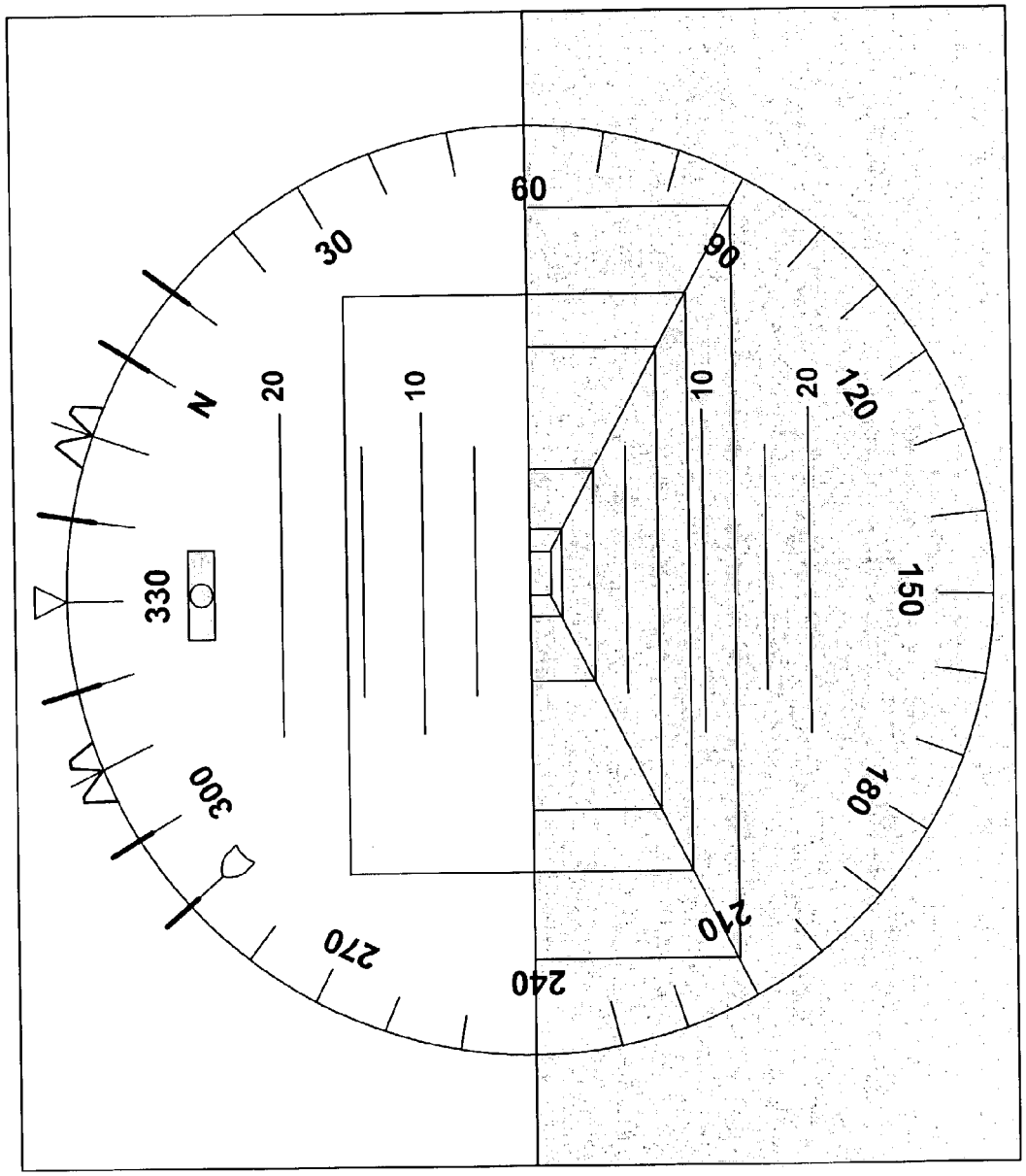
FIG. 19H illustrates another embodiment of flight information on an MFD, as shown in FIG. 19G.

FIG. 19H illustrates another embodiment of flight information on an MFD, as shown in FIG. 19G. As shown in 19H, in one implementation, display section 1900 includes heading indicator 1901, attitude indicator 1903, HITS indicator 1907, reference frame 1908, heading bug 1909, left bank angle indications 1910, right bank angle indications 1911, rate indications 1912, electronic inclinometer 1921, and a ground/sky indication 1922. In this implementation, heading indicator 1901, attitude indicator 1903, HITS indicator 1907, reference frame 1908, heading bug 1909, left bank angle indications 1910, right bank angle indications 1911, rate indications 1912, and electronic inclinometer 1921 are the same as in FIGS. 19A-19G.

FIG. 19H also comprises ground/sky indication 1922, which provides a visual cue between the ground and the sky. In one implementation, the ground is represented by a brown color, and the sky is represented by a blue color. Any color or symbol may be used to represent the ground and/or the sky. Indeed, any colors and any symbols may be used to represent any of the features on the MFD. The example shown in FIG. 19H is exemplary, and other implementations may also be used.

Figure 19I:
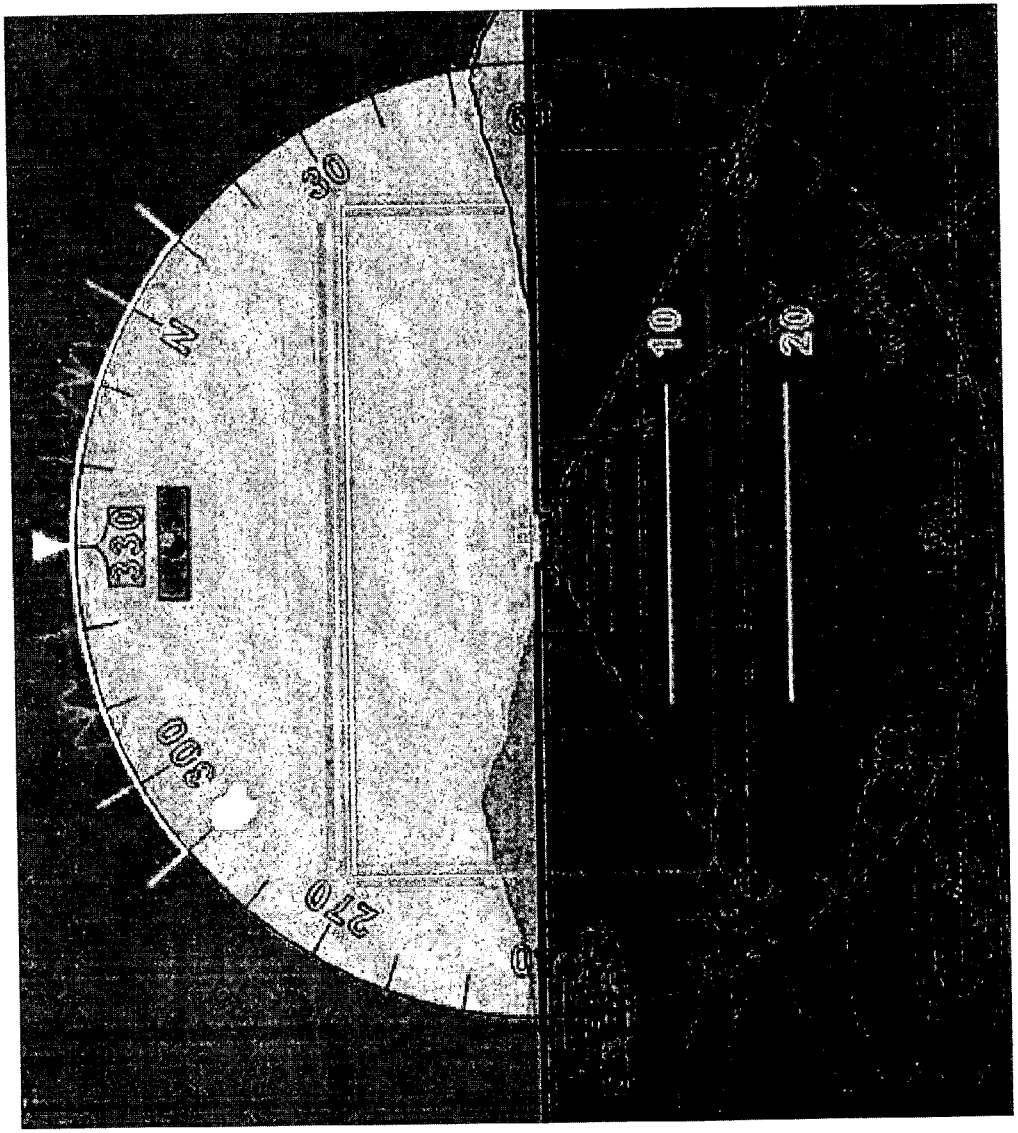
FIG. 19I illustrates another embodiment of flight information on a MFD, as shown in FIG. 19H.

FIG. 19I illustrates another embodiment of flight information on a MFD, as shown in FIG. 19H. As shown in FIG. 19I, in one implementation, display section 1900 includes heading indicator 1901, attitude indicator 1903, HITS indicator 1907, reference frame 1908, heading bug 1909, left bank angle indications 1910, right bank angle indications 1911, rate indications 1912, electronic inclinometer 1921, ground/sky indication 1922, and terrain data 1923. In this implementation, heading indicator 1901, attitude indicator 1903, HITS indicator 1907, reference frame 1908, heading bug 1909, left bank angle indications 1910, right bank angle indications 1911, rate indications 1912, electronic inclinometer 1921, and ground/sky indication 1922 are the same as in FIGS. 19A-19H.

FIG. 19I also comprises terrain data 1923, which provides terrain information on the MFD. As is well-known to those of ordinary skill in the art, terrain information includes, for example, representations of natural and man-made features, such as hills and buildings. As shown in FIG. 19I, in one implementation, the terrain information is overlaid directly onto the MFD. The pilot and co-pilot are able to select what features should be shown from the available terrain information. The pilot and co-pilot may also select the manner in which the terrain information is displayed on the MFD. The terrain information may be shown in a transparent depiction (as shown) or in a solid depiction (not shown). Other choices for the depiction of the terrain information include synthetic vision representations and three-dimensional representations. The example shown in FIG. 19I is exemplary, and other implementations may also be used.

As shown in FIG. 19I, the terrain information includes a number of possible features, including airport information, airspace information, ground information, and terrain features. Airport information includes Bravo airports (i.e., class B airports), Charlie airports (i.e., class C airports), and Delta airports (i.e., class D airports), which all have specific airspace requirements (and therefore visual representations). Airspace information also has specific visual representations, which may be depicted on the MFD. Ground information may also be depicted visually, such as highways and lakes, just to name a few. Ground information may include any type of ground information (such as, for example, rivers, railroads, buildings, or any other visually-distinctive features). Terrain features include information on a terrain feature that may be of interest to a pilot and co-pilot due to the height of the feature. Terrain features generally includes mountains. Terrain features may also include antennas, smoke stacks, or any other type of terrain feature. Additionally, any other type of information may also be depicted on the MFD. Again, the example shown in FIG. 19I is exemplary, and other implementations may also be used.

FIGS. 19A-19I illustrate how flight information may be depicted on a MFD. This information is provided to the MFD by the computer, as described in FIG. 9. One skilled in the art would know how to connect remote devices to a computer, so that the computer may generate the information to be displayed on the MFD.

Figure 20A:
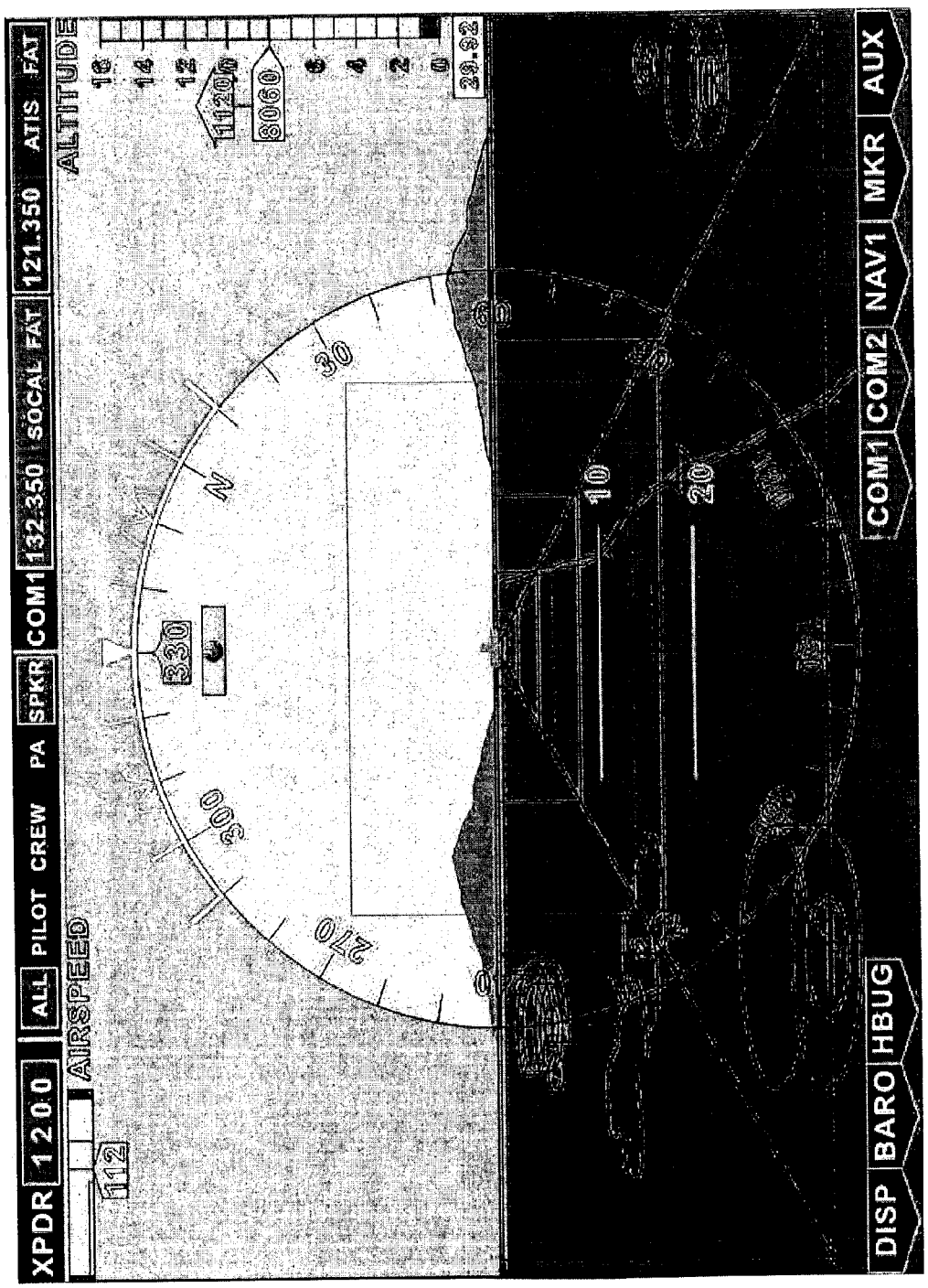
FIG. 20A illustrates an embodiment of combined flight information on a MFD consistent with the invention.

FIG. 20A illustrates an embodiment of combined flight information on a MFD consistent with the invention. As shown in FIG. 20A, a MFD 2000 comprises one example of the components described in FIGS. 10-19. As shown in FIG. 20A, MFD 2000 shows an aircraft in straight and level flight and tracking a HITS indicator 2010. The components described in FIGS. 10-19 are also depicted on MFD 2000 in FIG. 20A. As described above, however, MFD 2000 may include any combination of components (and subcomponents), as described herein. Indeed, the example shown in FIG. 20A is exemplary, and other implementations may also be used.

Figure 20B:
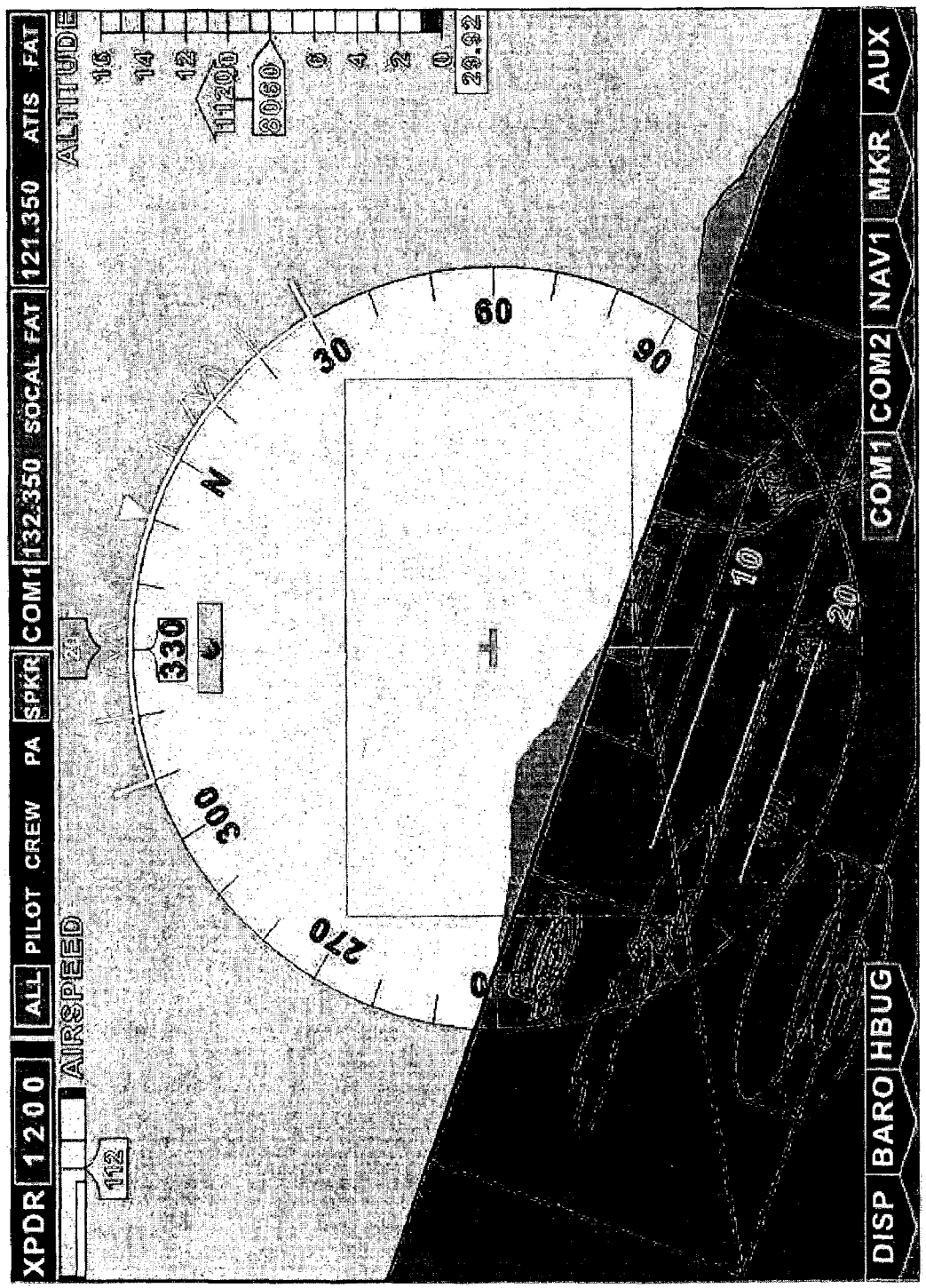
FIG. 20B illustrates another embodiment of combined flight information on a MFD consistent with the invention.

FIG. 20B illustrates another embodiment of combined flight information on a MFD consistent with the invention. As shown in FIG. 20B, an MFD 2050 comprises another example of the MFD described in FIG. 20A. However, in FIG. 20B, MFD 2050 shows the aircraft in a climbing turn to the left, and MFD 2050 clearly shows that the aircraft is not tracking HITS indicator 2020. The other components described in FIGS. 10-19 are also depicted on MFD 2050 in FIG. 20B, with respect to this aircraft in the climbing turn to the left. Again, as described above, the MFD may include any combination of components (or subcomponents), as described herein. The example shown in FIG. 20B is merely exemplary, and other implementations may also be used.

As described above, therefore, it will be apparent to those skilled in the art that various modifications and variations may be made in the apparatus and methods of the present invention without departing from the spirit and scope of the invention. Thus, it is intended that the present invention cover the modifications and variations of this invention, provided they come within the scope of the appended claims and their equivalents. In this context, equivalents mean each and every implementation for carrying out the functions recited in the claims, even if not explicitly described herein.

What is claimed is:

1. A method for providing flight information on an aircraft display, comprising:
   displaying heading flight information on the display, wherein the heading flight information further comprises a compass rose;
   displaying attitude flight information on the display, wherein the attitude flight information comprises an artificial horizon, and wherein the artificial horizon is situated within the compass rose;
   displaying turn indicator flight information on the display, wherein the turn indictor flight information further comprises bank angle indicator information and turn rate information, and wherein the bank angle indicator information and turn rate information is depicted on the compass rose; and
   wherein the heading flight information, attitude flight information, and turn indicator flight information are depicted together over background information on the compass rose, wherein the background information further comprises terrain data.

2. The method of claim 1, further comprising:
   displaying highway-in-the-sky indicator flight information on the display.

3. The method of claim 1, further comprising:
   displaying a reference frame on the display for providing a reference when flying an intended course.

4. The method of claim 1, further comprising:
   displaying a heading bug on the display, wherein the heading bug points to a location on the compass rose corresponding to an intended heading for the aircraft.

5. The method of claim 1, wherein the turn indicator flight information further comprises inclinometer indicator information, and wherein the inclinometer indicator information is situated within the compass rose.

6. The method of claim 1, further comprising displaying two-color ground/sky information, wherein one color indicates ground and the other color indicates sky.

7. The method of claim 1, further comprising displaying two-shade ground/sky information, wherein one shade indicates ground and the other shade indicates sky.

8. The method of claim 1, further comprising:
   displaying altitude flight information on the display.

9. The method of claim 1, further comprising:
   displaying airspeed flight information on the display.

10. The method of claim 1, further comprising:
    displaying vertical speed indicator flight information on the display.

11. The method of claim 1, further comprising:
    displaying transponder flight information on the display.

12. The method of claim 1, further comprising:
    displaying intercom flight information on the display.

13. The method of claim 1, further comprising:
    displaying communication flight information on the display.

14. The method of claim 1, further comprising:
    displaying selection flight information on the display to indicate available choices of flight information to be depicted on the display.

15. The method of claim 1, wherein the compass rose further comprises a numerical heading indication.

16. The method of claim 1, wherein there are two marks on the compass rose to indicate a standard rate turn.

17. The method of claim 16, wherein the marks are doghouse-shaped.

18. The method of claim 1, wherein the terrain data is transparent.

19. The method of claim 18, wherein the terrain data is three-dimensional.

20. A system for providing flight information on an aircraft display, comprising:
    a displaying component configured to display heading flight information on the display, wherein the heading flight information further comprises a compass rose;
    a displaying component configured to display attitude flight information on the display, wherein the attitude flight information comprises an artificial horizon, and wherein the artificial horizon is situated within the compass rose;
    a displaying component configured to display turn indicator flight information on the display, wherein the turn indictor flight information further comprises bank angle indicator information and turn rate information, and wherein the bank angle indicator information and turn rate information is depicted on the compass rose; and
    wherein the heading flight information, attitude flight information, and turn indicator flight information are depicted simultaneously over background information on the compass rose, wherein the background information further comprises terrain data.

21. The system of claim 20, further comprising:
    a displaying component configured to display highway-in-the-sky indicator flight information on the display.

22. The system of claim 20, further comprising:
a displaying component configured to display a reference frame on the display for providing a reference when flying an intended course.

23. The system of claim 20, further comprising:
a displaying component configured to display a heading bug on the display, wherein the heading bug points to a location on the compass rose corresponding to an intended heading for the aircraft.

24. The system of claim 20, wherein the turn indicator flight information further comprises inclinometer indicator information, and wherein the inclinometer indicator information is situated within the compass rose.

25. The system of claim 20, further comprising a displaying component configured to display two-color ground/sky information, wherein one color indicates ground and the other color indicates sky.

26. The system of claim 20, further comprising a displaying component configured to display two-shade ground/sky information, wherein one shade indicates ground and the other shade indicates sky.

27. The system of claim 20, further comprising:
a displaying component configured to display altitude flight information on the display.

28. The system of claim 20, further comprising:
a displaying component configured to display airspeed flight information on the display.

29. The system of claim 20, further comprising:
a displaying component configured to display vertical speed indicator flight information on the display.

30. The system of claim 20, further comprising:
a displaying component configured to display transponder flight information on the display.

31. The system of claim 20, further comprising:
a displaying component configured to display intercom flight information on the display.

32. The system of claim 20, further comprising:
a displaying component configured to display communication flight information on the display.

33. The system of claim 20, further comprising:
a displaying component configured to display selection flight information on the display to indicate available choices of flight information to be depicted on the display.

34. The system of claim 20, wherein the compass rose further comprises a numerical heading indication.

35. The system of claim 20, wherein there are two marks on the compass rose to indicate a standard rate turn.

36. The system of claim 35, wherein the marks are doghouse-shaped.

37. The system of claim 20, wherein the terrain data is transparent.

38. The system of claim 37, wherein the terrain data is three-dimensional.

39. A computer-implemented method of providing flight information on an aircraft display, comprising:
displaying heading flight information on the display, wherein the heading flight information further comprises a compass rose;
displaying attitude flight information on the display, wherein the attitude flight information comprises an artificial horizon, and wherein the artificial horizon is situated within the compass rose;
displaying turn indicator flight information on the display, wherein the turn indictor flight information further comprises bank angle indicator information and turn rate information, and wherein the bank angle indicator information and turn rate information is depicted on the compass rose; and
wherein the heading flight information, attitude flight information, and turn indicator flight information are depicted together over background information on the compass rose, wherein the background information further comprises terrain data.

40. A system for providing flight information on an aircraft display, comprising:
a displaying means for displaying heading flight information on the display, wherein the heading flight information further comprises a compass rose;
a displaying means for displaying attitude flight information on the display, wherein the attitude flight information comprises an artificial horizon, and wherein the artificial horizon is situated within the compass rose;
a displaying means for displaying turn indicator flight information on the display, wherein the turn indictor flight information further comprises bank angle indicator information and turn rate information, and wherein the bank angle indicator information and turn rate information is depicted on the compass rose; and
wherein the heading flight information, attitude flight information, and turn indicator flight information are depicted together over background information on the compass rose, wherein the background information further comprises terrain data.

41. A method for providing flight information on a display, comprising:
displaying heading flight information on the display, wherein the heading flight information further comprises a compass rose, which extends from approximately the top of the display to approximately the bottom of the display, and wherein the compass rose further comprises at least one numerical heading indicator;
displaying attitude flight information on the display, wherein the attitude flight information further comprises an artificial horizon, and wherein the artificial horizon is situated within the compass rose;
displaying turn indicator flight information on the display, wherein the turn indictor flight information further comprises bank angle indicator information, turn rate information, and inclinometer indicator information, wherein the bank angle indicator information and turn rate information is depicted on the compass rose, wherein there are two doghouse-shaped marks on the compass rose to indicate a standard rate turn, and wherein the inclinometer indicator information is situated within the compass rose; and
wherein the heading flight information, attitude flight information, and turn indicator flight information are depicted together over background information on the compass rose, wherein the background information further comprises terrain data.

42. The method of claim 41, further comprising: displaying highway-in-the-sky indicator flight information on the display.

43. The method of claim 41, further comprising:
displaying a reference frame on the display for providing a reference when flying an intended course.

44. The method of claim 41, further comprising:
displaying a heading bug on the display, wherein the heading bug points to a location on the compass rose corresponding to an intended heading for the aircraft.

45. The method of claim 41, further comprising displaying two-color ground/sky information, wherein one color indicates ground and the other color indicates sky.

46. The method of claim 41, further comprising displaying two-shade ground/sky information, wherein one shade indicates ground and the other shade indicates sky.

47. The method of claim 41, further comprising:
displaying altitude flight information on the display.

48. The method of claim 41, further comprising:
displaying airspeed flight information on the display.

49. The method of claim 41, further comprising:
displaying vertical speed indicator flight information on the display.

50. The method of claim 41, further comprising:
displaying transponder flight information on the display.

51. The method of claim 41, further comprising:
displaying intercom flight information on the display.

52. The method of claim 41, further comprising:
displaying communication flight information on the display.

53. The method of claim 41, further comprising:
displaying selection flight information on the display to indicate available choices of flight information to be depicted on the display.

54. The method of claim 41, wherein the compass rose further comprises a numerical heading indication.

55. The method of claim 41, wherein the terrain data is transparent.

56. The method of claim 55, wherein the terrain data is three-dimensional.

57. A system for providing flight information on a display, comprising:
a displaying component configured to display heading flight information on the display, wherein the heading flight information further comprises a compass rose, which extends from approximately the top of the display to approximately the bottom of the display, and wherein the compass rose further comprises at least one numerical heading indicator;
a displaying component configured to display attitude flight information on the display, wherein the attitude flight information further comprises an artificial horizon, and wherein the artificial horizon is situated within the compass rose;
a displaying component configured to display turn indicator flight information on the display, wherein the turn indictor flight information further comprises bank angle indicator information, turn rate information, and inclinometer indicator information, wherein the bank angle indicator information and turn rate information is depicted on the compass rose, wherein there are two doghouse-shaped marks on the compass rose to indicate a standard rate turn, and wherein the inclinometer indicator information is situated within the compass rose; and
wherein the heading flight information, attitude flight information, and turn indicator flight information are depicted together over background information on the compass rose, wherein the background information further comprises terrain data.

58. The system of claim 57, further comprising: a displaying component configured to display highway-in-the-sky indicator flight information on the display.

59. The system of claim 57, further comprising: a displaying component configured to display a reference frame on the display for providing a reference when flying an intended course.

60. The system of claim 57, further comprising: a displaying component configured to display a heading bug on the display, wherein the heading bug points to a location on the compass rose corresponding to an intended heading for the aircraft.

61. The system of claim 57, further comprising a displaying component configured to display two-color ground/sky information, wherein one color indicates ground and the other color indicates sky.

62. The system of claim 57, further comprising a displaying component configured to display two-shade ground/sky information, wherein one shade indicates ground and the other shade indicates sky.

63. The system of claim 57, further comprising: a displaying component configured to display altitude flight information on the display.

64. The system of claim 57, further comprising: a displaying component configured to display airspeed flight information on the display.

65. The system of claim 57, further comprising: a displaying component configured to display vertical speed indicator flight information on the display.

66. The system of claim 57, further comprising: a displaying component configured to display transponder flight information on the display.

67. The system of claim 57, further comprising: a displaying component configured to display intercom flight information on the display.

68. The system of claim 57, further comprising: a displaying component configured to display communication flight information on the display.

69. The system of claim 57, further comprising: a displaying component configured to display selection flight information on the display to indicate available choices of flight information to be depicted on the display.

70. The system of claim 57, wherein the compass rose further comprises a numerical heading indication.

71. The system of claim 57, wherein the terrain data is transparent.

72. The system of claim 71, wherein the terrain data is three-dimensional.

73. A computer-implemented method of providing flight information on a display, comprising:
displaying heading flight information on the display, wherein the heading flight information further comprises a compass rose, which extends from approximately the top of the display to approximately the bottom of the display, and wherein the compass rose further comprises at least one numerical heading indicator;
displaying attitude flight information on the display, wherein the attitude flight information further comprises an artificial horizon, and wherein the artificial horizon is situated within the compass rose;
displaying turn indicator flight information on the display, wherein the turn indictor flight information further comprises bank angle indicator information, turn rate information, and inclinometer indicator information, wherein the bank angle indicator information and turn rate information is depicted on the compass rose, wherein there are two doghouse-shaped marks on the compass rose to indicate a standard rate turn, and wherein the inclinometer indicator information is situated within the compass rose; and
wherein the heading flight information, attitude flight information, and turn indicator flight information are depicted together over background information on the compass rose, wherein the background information further comprises terrain data.

74. A system for providing flight information on a display, comprising:
- a displaying means for displaying heading flight information on the display, wherein the heading flight information further comprises a compass rose, which extends from approximately the top of the display to approximately the bottom of the display, and wherein the compass rose further comprises at least one numerical heading indicator;
- a displaying means for displaying attitude flight information on the display, wherein the attitude flight information further comprises an artificial horizon, and wherein the artificial horizon is situated within the compass rose;
- a displaying means for displaying turn indicator flight information on the display, wherein the turn indictor flight information further comprises bank angle indicator information, turn rate information, and inclinometer indicator information, wherein the bank angle indicator information and turn rate information is depicted on the compass rose, wherein there are two doghouse-shaped marks on the compass rose to indicate a standard rate turn, and wherein the inclinometer indicator information is situated within the compass rose; and
- wherein the heading flight information, attitude flight information, and turn indicator flight information are depicted together over background information on the compass rose, wherein the background information further comprises terrain data.

75. A method for providing flight information on an aircraft display, comprising:
- displaying heading flight information on the display, wherein the heading flight information further comprises a compass rose, which extends from approximately the top of the display to approximately the bottom of the display, wherein the compass rose further comprises a numerical heading indication;
- displaying attitude flight information on the display, wherein the attitude flight information comprises an artificial horizon, and wherein the artificial horizon is situated within the compass rose;
- displaying turn indicator flight information on the display, wherein the turn indictor flight information further comprises bank angle indicator information, turn rate information, and inclinometer indicator information, wherein the bank angle indicator information and turn rate information is depicted on the compass rose, wherein there are two doghouse-shaped marks on the compass rose to indicate a standard rate turn, and wherein the inclinometer indicator information is situated within the compass rose;
- displaying highway-in-the-sky indicator flight information on the display;
- displaying a reference frame on the display for providing a reference when flying an intended course;
- displaying a heading bug on the display, wherein the heading bug points to a location on the compass rose corresponding to an intended heading for the aircraft;
- displaying two-color ground/sky information, wherein one color indicates ground and the other color indicates sky;
- displaying altitude flight information on the display;
- displaying airspeed flight information on the display;
- displaying vertical speed indicator flight information on the display;
- displaying transponder flight information on the display;
- displaying intercom flight information on the display;
- displaying communication flight information on the display;
- displaying selection flight information on the display to indicate available choices of flight information to be depicted on the display; and
- wherein the heading flight information, attitude flight information, and turn indicator flight information are depicted together over background information on the compass rose, wherein the background information further comprises transparent three-dimensional terrain data.

76. A system for providing flight information on an aircraft display, comprising:
- a displaying component configured to display heading flight information on the display, wherein the heading flight information further comprises a compass rose, which extends from approximately the top of the display to approximately the bottom of the display, wherein the compass rose further comprises a numerical heading indication;
- a displaying component configured to display attitude flight information on the display, wherein the attitude flight information comprises an artificial horizon, and wherein the artificial horizon is situated within the compass rose;
- a displaying component configured to display turn indicator flight information on the display, wherein the turn indictor flight information further comprises bank angle indicator information, turn rate information, and inclinometer indicator information, wherein the bank angle indicator information and turn rate information is depicted on the compass rose, wherein there are two doghouse-shaped marks on the compass rose to indicate a standard rate turn, and wherein the inclinometer indicator information is situated within the compass rose;
- a displaying component configured to display highway-in-the-sky indicator flight information on the display;
- a displaying component configured to display a reference frame on the display for providing a reference when flying an intended course;
- a displaying component configured to display a heading bug on the display, wherein the heading bug points to a location on the compass rose corresponding to an intended heading for the aircraft;
- a displaying component configured to display two-color ground/sky information, wherein one color indicates ground and the other color indicates sky;
- a displaying component configured to display altitude flight information on the display;
- a displaying component configured to display airspeed flight information on the display;
- a displaying component configured to display vertical speed indicator flight information on the display;
- a displaying component configured to display transponder flight information on the display;
- a displaying component configured to display intercom flight information on the display;
- a displaying component configured to display communication flight information on the display;

a displaying component configured to display selection flight information on the display to indicate available choices of flight information to be depicted on the display; and wherein the heading flight information, attitude flight information, and turn indicator flight information are depicted together over background information on the compass rose, wherein the background information further comprises transparent three-dimensional terrain data.

77. A computer-implemented method for providing flight information on an aircraft display, comprising:

displaying heading flight information on the display, wherein the heading flight information further comprises a compass rose, which extends from approximately the top of the display to approximately the bottom of the display, wherein the compass rose further comprises a numerical heading indication;

displaying attitude flight information on the display, wherein the attitude flight information comprises an artificial horizon, and wherein the artificial horizon is situated within the compass rose;

displaying turn indicator flight information on the display, wherein the turn indictor flight information further comprises bank angle indicator information, turn rate information, and inclinometer indicator information, wherein the bank angle indicator information and turn rate information is depicted on the compass rose, wherein there are two doghouse-shaped marks on the compass rose to indicate a standard rate turn, and wherein the inclinometer indicator information is situated within the compass rose;

displaying highway-in-the-sky indicator flight information on the display;

displaying a reference frame on the display for providing a reference when flying an intended course;

displaying a heading bug on the display, wherein the heading bug points to a location on the compass rose corresponding to an intended heading for the aircraft;

displaying two-color ground/sky information, wherein one color indicates ground and the other color indicates sky;

displaying altitude flight information on the display;

displaying airspeed flight information on the display;

displaying vertical speed indicator flight information on the display;

displaying transponder flight information on the display;

displaying intercom flight information on the display;

displaying communication flight information on the display;

displaying selection flight information on the display to indicate available choices of flight information to be depicted on the display; and wherein the heading flight information, attitude flight information, and turn indicator flight information are depicted together over background information on the compass rose, wherein the background information further comprises transparent three-dimensional terrain data.

78. A system for providing flight information on an aircraft display, comprising:

a displaying means for displaying heading flight information on the display, wherein the heading flight information further comprises a compass rose, which extends from approximately the top of the display to approximately the bottom of the display, wherein the compass rose further comprises a numerical heading indication;

a displaying means for displaying attitude flight information on the display, wherein the attitude flight information comprises an artificial horizon, and wherein the artificial horizon is situated within the compass rose;

a displaying means for displaying turn indicator flight information on the display, wherein the turn indictor flight information further comprises bank angle indicator information, turn rate information, and inclinometer indicator information, wherein the bank angle indicator information and turn rate information is depicted on the compass rose, wherein there are two doghouse-shaped marks on the compass rose to indicate a standard rate turn, and wherein the inclinometer indicator information is situated within the compass rose;

a displaying means for displaying highway-in-the-sky indicator flight information on the display;

a displaying means for displaying a reference frame on the display for providing a reference when flying an intended course;

a displaying means for displaying a heading bug on the display, wherein the heading bug points to a location on the compass rose corresponding to an intended heading for the aircraft;

a displaying means for displaying two-color ground/sky information, wherein one color indicates ground and the other color indicates sky;

a displaying means for displaying altitude flight information on the display; a displaying means for displaying airspeed flight information on the display;

a displaying means for displaying vertical speed indicator flight information on the display; a displaying means for displaying transponder flight information on the display;

a displaying means for displaying intercom flight information on the display;

a displaying means for displaying communication flight information on the display;

a displaying means for displaying selection flight information on the display to indicate available choices of flight information to be depicted on the display; and wherein the heading flight information, attitude flight information, and turn indicator flight information are depicted together over background information on the compass rose, wherein the background information further comprises transparent three-dimensional terrain data.

* * * * *